United States Patent
Nashiki et al.

(10) Patent No.: US 8,395,294 B2
(45) Date of Patent: Mar. 12, 2013

(54) AC MOTOR WITH LOOP WINDINGS AND IMPROVED MAGNETIC FLUX PATHS

(75) Inventors: Masayuki Nashiki, Komaki (JP); Shinji Makita, Kakamigahara (JP); Yoshinobu Kamada, Ichinomiya (JP); Eisuke Takahashi, Kariya (JP)

(73) Assignee: Denso Corporation, Kariya (JP)

( * ) Notice: Subject to any disclaimer, the term of this patent is extended or adjusted under 35 U.S.C. 154(b) by 377 days.

(21) Appl. No.: 12/654,497

(22) Filed: Dec. 22, 2009

(65) Prior Publication Data
US 2010/0156232 A1 Jun. 24, 2010

(30) Foreign Application Priority Data
Dec. 19, 2008 (JP) .................................. 2008-323717

(51) Int. Cl.
*H02K 3/16* (2006.01)
(52) U.S. Cl. ........................................ 310/179; 310/198
(58) Field of Classification Search .................. 310/159, 310/179, 180, 201–204, 208, 198, 49.43, 310/49.44, 49.45, 156.55
See application file for complete search history.

(56) References Cited

U.S. PATENT DOCUMENTS

| | | | |
|---|---|---|---|
| 7,911,107 B2* | 3/2011 | Nashiki ......................... | 310/208 |
| 2005/0012427 A1* | 1/2005 | Seki et al. ..................... | 310/257 |
| 2005/0099082 A1* | 5/2005 | Nashiki ......................... | 310/164 |
| 2008/0197739 A1* | 8/2008 | Nashiki ..................... | 310/156.55 |
| 2008/0290754 A1* | 11/2008 | Makita et al. ................. | 310/159 |

FOREIGN PATENT DOCUMENTS

| | | |
|---|---|---|
| JP | A-6-261513 | 9/1994 |
| JP | A-7-227075 | 8/1995 |
| JP | A-2001-037108 | 2/2001 |
| JP | A-2004-153986 | 5/2004 |
| JP | A-2005-20981 | 1/2005 |
| JP | A-2005-160285 | 6/2005 |
| WO | WO 2007/043161 A1 | 4/2007 |

OTHER PUBLICATIONS

Office Action issued in Japanese Patent Application No. 2008-323717 dated May 31, 2011 (with translation).

* cited by examiner

*Primary Examiner* — Hanh Nguyen
*Assistant Examiner* — Naishadh Desai
(74) *Attorney, Agent, or Firm* — Oliff & Berridge, PLC

(57) ABSTRACT

An AC motor having loop windings is provided, which is able to reduce unbalance of three-phase impedance to enhance the motor efficiency. Three loop windings of the three phases are interlinked with magnetic fluxes Φu, Φv and Φw of the respective phases to provide magnetic paths of the three phases. The magnetic paths of the three phases are connected to the respective stator poles of the three phases to configure the motor. The magnetic path of each of the three phases is formed by processing an electromagnetic steel plate using bending to provide a motor configuration having multiple stator poles. Magnetic fluxes of two or more stator poles of the same phase are collected to a single magnetic path to form a three-dimensional three-phase magnetic path without allowing close contact with a magnetic path of a different phase.

12 Claims, 28 Drawing Sheets

CIRCUMFERENTIAL DIRECTION

AXIAL DIRECTION OF ROTOR

AC MOTOR WITH LOOP WINDINGS AND IMPROVED MAGNETIC FLUX PATHS

CROSS-REFERENCE TO RELATED APPLICATION

This application is based on and claims the benefit of priority from earlier Japanese Patent Application No. 2008-323717 filed Dec. 19, 2008, the description of which is incorporated herein by reference.

BACKGROUND OF THE INVENTION

1. Technical Field of the Invention

The present invention relates to brushless AC (alternating-current) motors installed on automobiles and trucks, for example, and relates to control apparatuses for the brushless AC motors.

2. Related Art

Three-phase AC motors are widely used. FIG. 43 is a schematic vertical cross-sectional view illustrating an example of the configuration of such a three-phase brushless AC motor as a surface magnet brushless motor. In the figure, indicated by 511 is a motor output shaft, by 512 is a rotor core, by 519 are N- and S-pole permanent magnet segments attached to the surface of the rotor, by 513 is a bearing, by 514 is a stator core, by 515 is a coil end formed of the windings and by 516 is a motor case.

FIG. 44 is a horizontal cross-sectional view taken along a line AA-AA of FIG. 43. This three-phase AC motor has four poles and six slots and is provided with short-pitch concentrated winding.

Indicated by TBU1 and TBU2 are U-phase stator poles, by TBV1 and TBV2 are V-phase stator poles and by TBW1 and TBW2 are W-phase stator poles.

Stator poles of each of the phases are provided with turns of windings. Indicated by WBU1 and WBU2 are U-phase windings, by WBV1 and WBV2 are V-phase windings and by WBW1 and WBW2 are W-phase windings. Indicated by 517 are N-pole permanent magnet segments and by 518 are S-pole permanent magnet segments.

In the motor shown in FIGS. 43 and 44, the rotor can be rotated by controlling the attraction force and the repulsive force acting between the stator poles and the S- and N-pole magnet segments 517 and 518 magnet, with the control of the current passing through the phase windings.

FIG. 45 is a winding diagram in which the abscissa indicates position θer, in terms of electrical angle, of the stator in the rotating direction. Since this motor is exemplified as a motor having four poles, the electrical angle indicated in the abscissa ranges from 0° to 720°. Indicated by U is a terminal of the U-phase, to which U-phase current Iu is applied, by V is a terminal of the V-phase, to which V-phase current Iv is applied, and by W is a terminal of the W-phase, to which W-phase current Iw is applied. Indicated by N is a neutral point of the three-phase Y connection.

Surface magnet brushless motors as shown in FIGS. 43 to 45 have been widely used as excellent motors. However, as shown in FIGS. 44 and 45, the windings are separately wound about the stator poles, i.e. teeth, of the individual phases. Although such a brushless motor has a relatively simple structure, further simplification may be expected.

An example of such a brushless motor can be seen in Japanese Patent Application Laid-Open Publication No. 6-261513 (see FIGS. 1 and 4).

It should be appreciated that, throughout the specification, when a term "circumferential direction" or "circumferentially" is used, the term indicates the direction along the circumference of the motor. Also, when a term "axial direction" or "axially" is used, the term indicates the direction along the shaft of the rotor.

FIG. 46 is a vertical cross-sectional view illustrating an example of another brushless AC motor. This motor is a three-phase eight-pole motor. In the figure, indicated by 541 is a rotor shaft, by 542 is a permanent magnet assembly of the rotor, by 543 is a motor case and by 544 is a back yoke portion of the stator core. Further, indicated by 549 are U-phase stator poles, by 54A are V-phase stator poles and by 54B are W-phase stator poles. Indicated by 545 is a negative U-phase winding wound into a looped shape (i.e., ring-shaped) substantially along the circumference. Indicated by 546 is a positive V-phase winding and by 547 is a negative V-phase winding, each also having a looped shape. Indicated by 548 is a positive W-phase winding.

It should be appreciated that a negative winding is a winding which is wound in a direction opposite to the winding direction of a positive winding. In other words, a negative winding is a winding through which electrical current is passed in a direction reverse of the direction of the electrical current passed through a positive winding.

FIG. 47 is a linear development showing a relationship between the shapes of the stator poles of the individual phases of the motor shown in FIG. 46, as seen from the rotor, and the respective windings. Specifically, indicated by 549 are the shapes of the U-phase stator poles arranged along the circumferential direction as seen from the rotor. The horizontal direction as viewed in the figure corresponds to the circumferential direction. As can be seen, four U-phase stator poles 549 are arranged along one circuit of the motor. Likewise, indicated by 54A are V-phase stator poles and by 54B are W-phase stator poles.

The U-, V- and W-phase stator poles 549, 54A and 54B are relatively and mutually shifted by 120° in electrical angle, i.e. 30° in mechanical angle, in the circumferential direction. The vertical direction as viewed in FIG. 47 corresponds to the axial direction. FIG. 47 exemplifies the stator poles of the individual phases, which are mutually shifted between phases in the axial direction.

In order to generate rotation torque based on the principle of operation of the brushless motor shown in FIGS. 43 to 45 in the arrangement of the stator poles as shown in FIG. 47, turns of the windings as indicated by the solid and broken lines in FIG. 47 may be given, with the supply of three-phase current.

First, the U-phase winding is routed along a path (1) and wound about the leftmost U-phase stator pole by a predetermined number of turns Nn. Then, the U-phase winding is routed along a crossover path (2) and wound about the second U-phase stator pole from the left along paths (3), (4), (5) and (6) by the predetermined number of turns Nn. After that, the U-phase winding is routed along a crossover path (7) and wound about the third U-phase stator pole from the left along paths (8), (9) and (10) by the predetermined number of turns Nn. Finally, the U-phase winding is wound about the fourth U-phase stator pole from the left in the similar manner and connected to the neutral point N of the three-phase star connection.

For the V phase, the turns of the winding is imparted in the similar manner. Specifically, the V-phase winding is routed along a path (11) and wound about the leftmost V-phase stator pole by the predetermined number of turns Nn. Then, the V-phase winding is routed along a crossover path (12) and wound about the second V-phase stator pole from the left along paths (13), (14), (15) and (16) by the predetermined number of turns Nn. After that, the V-phase winding is routed along a crossover path (17) and wound about the third V-phase stator pole from the left along paths (18), (19) and (20) by the predetermined number of turns Nn. Finally, the V-phase winding is wound about the fourth V-phase stator pole from the left in the similar manner and connected to the neutral point N of the three-phase star connection.

For the phase W, the turns of the winding is imparted in the similar manner. Specifically, the W-phase winding is routed along a path (21) and wound about the leftmost W-phase stator pole by the predetermined number of turns Nn. Then, the W-phase winding is routed along a crossover path (22) and wound about the second W-phase stator pole from the left along paths (23), (24), (25) and (26) by the predetermined number of times Nn. After that, the W-phase winding is routed along a crossover path (27) and wound about the third W-phase stator pole from the left along paths (28), (29) and (30) by the predetermined number of turns Nn. Finally, the W-phase winding is wound about the fourth W-phase stator pole from the left in the similar manner and connected to the neutral point N of the three-phase star connection.

Let us assume that, in such a configuration shown in FIG. 47, the number of turns Nn is the same as in the motor shown in FIG. 45, and the phases of the stator poles of the individual phases coincide, in the circumferential direction, with those of the permanent magnet segments of the rotor. In this case, the electromagnetic force associated with the generation of the circumferential torque and acting between the stator poles and the permanent magnet segments of the rotor will be the same between the motor configurations shown in FIGS. 45 and 47.

Hereinafter will be discussed, in detail, the electromagnetic action of the current passing through the windings shown in FIG. 47. As can be seen in FIG. 47, in the phase U, the same current passes in the opposite directions through the paths (1) and (3) to thereby cancel field intensity H generated by the current passing through these paths. Accordingly, no electromagnetic action is caused, negating the need of supplying current through either of the paths. The same applies to the paths (5) and (8).

A magnetic path to the back yoke connected to each of the stator poles of the three phases is configured as shown in FIG. 47. Since the paths (6) and (10) are located outside the magnetic path, the field intensity H caused by the current passing through the paths (6) and (10) will act on a magnetic circuit serially connected to an air portion that surrounds the winding portions associated with these paths. Accordingly, since the magnetic resistance of such an air portion is very large, the current passing through the paths (6) and (10) will barely act on the magnetic circuit of the motor, negating the need of the winding portions associated with these paths and the current passing therethrough. Thus, the winding portions associated with the paths (6) and (10) or the like and located outside the core can be omitted.

Let us discuss the phase V. As can be seen in FIG. 47, the same current passes in the opposite directions through the paths (11) and (13) to thereby cancel the field intensity H generated by the current passing through the paths (11) and (13). Accordingly, no electromagnetic action is caused, negating the need of supplying current through either of the paths. The same applies to the paths (15) and (18). Four paths, i.e. the paths (16) and (20) as well as the paths (14) and (19), unlike the case of the phase U, are located inside the stator core to permit magnetomotive force to act on the stator poles. Therefore, these four paths cannot be omitted.

Let us discuss the phase W. As can be seen in FIG. 47, the same current passes in the opposite directions through the paths (21) and (23) to thereby cancel the field intensity H generated by the current passing through the paths (21) and (23). Accordingly, no electromagnetic action is caused, negating the need of supplying current through either of the paths. The same applies to the paths (25) and (28). Similar to the paths (4) and (9) of the phase U, the paths (26) and (30) are located inside the stator core to permit magnetomotive force to act on the stator poles. Therefore, these paths cannot be omitted. The winding portions corresponding to the paths (24) and (29) can be omitted, because they are located outside the core, similar to the paths (6) and (10) of the phase U.

As described above, the windings portions located between the stator poles in the circumferential direction can be omitted. Therefore, the windings shown in FIG. 47 can be replaced by six loop windings wound in the circumferential direction. In this case, two loop windings that will be located at both ends in the axial direction can be omitted because they are located outside the magnetic circuit of the stator and thus will barely influence the electromagnetic action within the stator. As a result, four loop windings can be provided as the loop windings 545, 546, 547 and 548 shown in FIG. 46. FIG. 49 illustrates a configuration of these windings in the state of being linearly developed. In the figure, the abscissa indicates mechanical angle and the broken lines indicate the image of the permanent magnet assembly 542 facing the stator.

FIG. 50 illustrates in a simplified fashion the windings shown in FIG. 49. The windings 545 and 546, which are arranged in the same space, can be combined into a single loop winding 571 shown in FIG. 50. The current (−Iu) that should be passed through the winding 545 and the current (Iv) that should be passed through the winding 546 may be arithmetically added up and passed through the winding 571 as current Im.

$$Im=(-Iu+Iv) \tag{1}$$

Similarly, the windings 547 and 548, which are arranged in the same space, can be combined into a single loop winding 572 shown in FIG. 50. The current (−Iv) that should be passed through the winding 547 and the current (Iw) that should be passed through the winding 548 may be arithmetically added up and passed through the winding 572 as current In.

$$In=(-Iv+Iw) \tag{2}$$

In this way, the windings are simplified and thus the manufacture of motors can be facilitated. Also, Joule loss can be reduced by 25% and thus the motor efficiency can be enhanced.

The vertical cross section of the motor shown in FIG. 46 may be turned to the vertical cross section of the motor, as shown in FIG. 51, having simplified windings 571 and 572. A loop winding may have a specific shape as shown in FIGS. 48A and 48B, taking the loop winding 545 of FIG. 46 as an example. FIG. 48A is a plan view of the loop winding and FIG. 48B is a right-side view of the loop winding. Since the structure is simple, loop windings, as shown in FIGS. 48A and 48B, can be easily manufactured when compared with the conventional windings which were wound about the teeth concerned.

FIG. 52 exemplifies the voltages, currents and connecting method for the windings illustrated in FIGS. 50 and 51. FIG. 52 shows the configuration of a three-phase delta connection in the absence of one winding line. Currents to be supplied to motor terminals 591, 592 and 593 are expressed by Im=−Iu+Iv, Io=−Iw+Iu and In=−Iv+Iw, respectively, that constitute balanced three-phase currents.

$$Io=-Iw+Iu=-Im-In \tag{3}$$

The voltages, excepting those corresponding to impedance drop of the windings, constitute balanced three-phase voltages. In the case of a compact motor, however, the proportion of the voltages corresponding to the impedance drop in the motor voltages may become large, which may lead to the problem of unbalanced voltages. Reference may be made to Japanese Patent No. 4007339 (see FIGS. 1, 11 and 13).

SUMMARY OF THE INVENTION

The present invention has as its object to provide a stator for a three-phase AC motor, which is able to attain high efficiency with the reduction in the size and the cost. In particular, the present invention has as its object to provide a simplified high-performance compact motor at low cost, which includes a three-dimensional magnetic circuit formed by bending an electromagnetic steel plate.

The motor of the present invention is constituted of three loop windings and magnetic paths that interlink with the respective loop windings. Specifically, the motor of the present invention comprises: a U-phase stator pole (magnetic pole) Ju; a loop winding Lu interlinked with magnetic flux $\Phi u$ that passes through the U-phase stator pole Ju; a V-phase stator pole Jv; a loop winding Lv interlinked with magnetic flux $\Phi v$ that passes through the V-phase stator pole Jv; a W-phase stator pole Jw; and a loop winding Lw interlinked with magnetic flux $\Phi w$ that passes through the W-phase stator pole Jw.

The rotor included in the motor may be a surface magnet rotor or an integrated magnet rotor. An electromagnetic steel plate may be bent to form a main magnetic circuit (i.e., most of a magnetic circuit) and stator poles (stator magnetic poles). Specifically, a flat electromagnetic steel plate material may be subjected to such processes as punching, molding, bending and drawing. Combining these processes, the shape of a three-dimensional magnetic path can be realized relatively easily.

In the motor of the present invention: the loop windings Lu, Lv and Lw of the three phases are arranged so as to be substantially parallel to each other; and the magnetic fluxes $\Phi u$, $\Phi v$ and $\Phi w$ that interlink with the loop windings Lu, Lv and Lw, respectively, of the three phases are unidirectionally directed.

In other words, the motor of the present invention is configured such that, when three-phase currents Iu, Iv and Iw are applied to the three-phase loop windings Lu, Lv and Lw, respectively, the magnetomotive force applied in the axial direction is cancelled by the offsetting action of the three-phase currents.

In the motor of the present invention: the loop windings Lu, Lv and Lw of the three phases are arranged so as to be substantially parallel to each other; and the three phases in which the magnetic fluxes $\Phi u$, $\Phi v$ and $\Phi w$ interlink with the windings Lu, Lv and Lw, respectively, include a phase in which the magnetic flux is differently directed, the winding in the phase with differently directed magnetic flux having a winding start and a winding end which are reversed from those in other phases with unidirectionally directed magnetic fluxes.

With the motor of the present invention, the magnetic circuit can be simplified by selecting a current direction which is convenient for configuring the magnetic circuit.

The motor of the present invention can use both of the front-side magnetic flux and rear-side magnetic flux of a disk-like permanent magnet assembly, whereby a motor having high torque can be realized.

Specifically, the motor of the present invention comprises: a rotor configured to use magnetic flux $\Phi k$ of a front face of a permanent magnet assembly and magnetic flux $\Phi p$ of a rear face thereof; a U-phase stator pole Suk located opposed to the front face of the permanent magnet assembly; a U-phase stator pole Sup located opposed to the rear face of the permanent magnet assembly; a magnetic path Ju that allows passage of magnetic flux $\Phi uk$ passing through the U-phase stator pole Suk, in combination with magnetic flux cup passing through the U-phase stator pole Sup; a V-phase stator pole Svk located opposed to the front face of the permanent magnet assembly; a V-phase stator pole Svp located opposed to the rear face of the permanent magnet assembly; a magnetic path Jv that allows passage of magnetic flux $\Phi vk$ passing through the V-phase stator pole Svk, in combination with magnetic flux $\Phi vp$ passing through the V-phase stator pole Svp; a W-phase stator pole Swk located opposed to the front face of the permanent magnet assembly; a W-phase stator pole Swp located opposed to the rear face of the permanent magnet assembly; and a magnetic path Jw that allows passage of magnetic flux $\Phi wk$ passing through the W-phase stator pole Swk, in combination with magnetic flux $\Phi wp$ passing through the W-phase stator pole Swp.

When the magnetic flux that interlinks with a winding is increased by a factor of two, the torque will logically be increased by a factor of two. In other words, Joule loss will be reduced to one fourth. Also, the magnet assembly can be effectively used because the portions of the magnet assembly, on which magnetomotive force acts, are different between the front side and the rear side of the magnet assembly.

Another mode of the motor of the present invention, i.e. two- or three-phase motor, for example, can be configured by combining two or more single-phase motor units, each utilizing the front- and rear-side magnetic flux of a disk-like permanent magnet assembly.

Specifically, this mode of motor of the present invention comprises: a rotor R1 configured to use magnetic flux $\Phi 1k$ of a front face of a permanent magnet assembly PM1 and magnetic flux $\Phi 1p$ of a rear face thereof; a first-phase stator pole S1k located opposed to the front face of the permanent magnet assembly PM1; a first-phase stator pole S1p located opposed the rear face of the permanent magnet assembly PM1; a magnetic path 31 that allows passage of magnetic flux $\Phi 1k$ passing through the first-phase stator pole S1k, in combination with magnetic flux $\Phi 1p$ passing through the first-phase stator pole S1p; a second-phase stator pole S2k arranged so as to have a phase difference of 180° in electrical angle from the first-phase stator pole S1k; a second-phase stator pole S2p arranged so as to have a phase difference of 180° in electrical angle from the first-phase stator pole S1p; a magnetic path 32 that allows passage of magnetic flux $\Phi 2k$ passing through the second-phase stator pole S2k, in combination with magnetic flux $\Phi 2p$ passing through the second-phase stator pole S2p; a loop winding that interlinks with first-phase magnetic flux $\Phi 1$; and magnetic paths, loop windings and a rotor similar to those of the first and second phases.

It should be appreciated that the single-phase motor units may alternatively be arranged on an inner diameter side and an outer diameter side.

Another mode of the motor of the present invention may be configured so as to have a simplified magnetic circuit, although the generated torque may be reduced compared to the two-phase motor described above.

Specifically, this mode of the motor of the present invention comprises: a rotor R1 configured to use magnetic flux $\Phi k$ of a front face of a permanent magnet assembly PM1 and magnetic flux $\Phi 1p$ of a rear face thereof; a first-phase stator pole S1$k$ located opposed to the front face of the permanent magnet assembly PM1; a loop winding L1 that interlinks with first-phase magnetic flux Φ1; a third-phase stator pole S3$p$ located opposed to the rear face of the permanent magnet assembly PM1 to allow passage of magnetic flux Φ3 that has a phase difference of 90° in electrical angle from the first-phase stator pole S1$k$; a loop winding L3 that interlinks with the third-phase magnetic flux Φ3; a fourth-phase stator pole S4$k$ located opposed to the front face of the permanent magnet assembly PM1, with a phase difference of 180° in electrical angle from the first-phase stator pole S1$k$; a fifth-phase stator pole S5$p$ located opposed to the rear face of the permanent magnet assembly PM1, with a phase difference of 180° in electrical angle from the third-phase stator pole S3$p$; and a magnetic path 345 that allows passage of magnetic flux Φ4 of the fourth-stator pole S4$k$ in combination with magnetic flux Φ5 of the fifth-phase stator pole S5$p$.

Another mode of the motor of the present invention, i.e. a two-phase motor, may be configured using loop windings and magnetic paths that have been formed by bending an electromagnetic steel plate. The motor may include a surface magnet rotor, an integrated magnet rotor, or the like.

Specifically, this mode of motor of the present invention comprises: a sixth-phase stator pole S6 located opposed to a rotor; a seventh-phase stator pole S7 having a phase difference of 90° in electrical angle from the sixth-phase stator pole S6; an eighth-phase stator pole S8 having a phase difference of 180° in electrical angle from the sixth-phase stator pole S6; a ninth-phase stator pole S9 having a phase difference of 270° in electrical angle from the sixth-phase stator pole S6; a loop winding L67 that interlinks with magnetic flux Φ6 passing through the sixth-phase stator pole S6 and magnetic flux Φ7 passing through the seventh-phase stator pole S7; and a loop winding L78 that interlinks with magnetic flux Φ7 passing through the seventh-phase stator pole S7 and magnetic flux Φ8 passing through the eighth-phase stator pole S8.

This mode of the motor can be driven not only by a two-phase inverter, but also by a three-phase inverter. The latter case can be realized by combining the three-phase windings and forming the combined windings into two-phase windings.

Another mode of the motor of the present invention, i.e. a three-phase motor, may be configured using two loop windings and an electromagnetic steel plate that has been bent.

Specifically, this mode of the motor of the present invention comprises: a U-phase stator pole Ju; a loop winding Lm interlinked with magnetic flux Φu passing through the U-phase stator pole Ju; a V-phase stator pole Jv; a W-phase stator pole Jw; and a loop winding Ln interlinked with magnetic flux Φw passing through the W-phase stator pole Jw, wherein: magnetic flux Φv passing through the V-phase stator pole Jv, the magnetic flux Φu and the magnetic flux Φw are combined; and the U-phase stator pole Ju, the V-phase stator pole Jv, the W-phase stator pole Jw and a magnetic circuit that allows passage of the magnetic fluxes of these stator poles are formed by bending an electromagnetic steel plate.

In the case of configuring stator poles facing the rotor by bending an electromagnetic steel plate, the eddy current and the eddy current loss in the portions concerned may constitute a problem. To take measures against this, a portion of each of the stator poles, which portion is located opposed to a rotor, is configured to be electrically separated in two directions by forming slits, or the like. Thus, stator poles having small eddy current loss can be configured.

Similarly, the eddy current caused at the connecting portions between magnetic paths on the side of the back yoke may also constitute a problem. Some techniques may be used for coping with this problem. Such techniques include: a technique for providing a configuration in which each electromagnetic steel plate is provided with slits; a technique for allowing electromagnetic steel plates to abut against one another, the abutting positions being offset from each other in the direction of the magnetic path; a technique for alternately overlapping, say, four electromagnetic steel plates to provide a structure a part of which is stacked with eight plates; and a technique for stacking, say, four electromagnetic steel plates by permitting these plates to abut against one another, the abutting portions forming a staircase pattern.

In the case where a magnetic path of the stator is configured by stacking electromagnetic steel plates that have been bent, the eddy current loss at the stator poles located opposed to the rotor may constitute a problem. As a specific measure against this, the electromagnetic steel plates in a portion of each of the stator poles, which portion is located opposed to a rotor, are electrically separated from each other. Thus, a configuration may be provided in which the stator poles have small eddy current loss.

Further, with the formation of slits, for example, in each of the electromagnetic steel plates at portions of the stator poles located opposed to the rotor, a configuration may be provided in which the stator poles have small eddy current loss.

For the purpose of simplifying the shape of each stator pole, for example, at its portion facing the rotor, the electromagnetic steel plates in a portion of each of the stator poles, which portion is located opposed to a rotor, are each configured to have a side face opposed to the rotor.

A flat electromagnetic steel plate material can be variously processed into a shape to effectively use the material with good yields.

Specifically, each stator pole and a magnetic path connected to the stator pole are each configured to have a cross-sectional area which is enlarged by partially bending an electromagnetic steel plate, or enlarged by allowing the folds of the electromagnetic steel plate to overlap with each other.

In a motor configuration using loop windings, it is important to reduce magnetic flux leakage from between the magnetic paths, in order to obtain peak torque and to enhance the power factor. Thus, it is required that the distance between the magnetic paths in each phase is ensured not to become small. As a specific measure against this, magnetic connection with a different-phase stator pole is configured to establish via a combined magnetic path to which magnetic fluxes passing two or more stator poles of the same phase are collected.

In order to reduce the axial vibration and noise, it is effective that the shape of a portion of the stator pole, which portion is located opposed to the rotor, is made symmetrical in the axial direction.

In particular, when a compact motor is required at low cost, an electromagnetic steel plate material is required to be effectively utilized from a viewpoint of yields, the number of parts and the number of steps of fabrication, for example. Specifically, most of magnetic paths of the stator, including stator poles and teeth of the individual phases, the stator poles and teeth being located opposed to the rotor, as well as a back yoke are formed from a substantially single electromagnetic steel plate, using molding, bending, and the like.

In a compact motor, in particular, the method of driving the motor is required to be contrived from the viewpoint of the manufacturing cost. As a specific example, the motor may comprise: a positive power source having a positive-side terminal T1 and a negative-side terminal T2; a negative power source having a positive-side terminal T3 and a negative-side terminal T4; an output terminal T5 connecting the terminals T2 and T3; serially connected two transistors TR1 and TR2, a collector of the transistor TR1 being connected to the terminal T1, an emitter of the transistor TR1 and a collector of the transistor TR2 being mutually connected to configure an output terminal T6, and an emitter of the transistor TR2 being connected to the terminal T4; and serially connected two transistors TR3 and TR4, a collector of the transistor TR3 being connected to the terminal T1, an emitter of the transistor TR3 and a collector of the transistor TR4 being mutually connected to configure an output terminal T7, and an emitter of the transistor TR4 being connected to the terminal T4, wherein: of three terminal TU, TV and TW of a three- or two-phase motor, the terminal TU is connected to the output terminal T6, the terminal TV is connected to the output terminal T5, and the terminal TW is connected to the output terminal T7.

DETAILED DESCRIPTION OF THE PREFERRED EMBODIMENTS

With reference to the accompanying drawings, hereinafter will be described in detail embodiments of the present invention.

The present invention provides an AC (alternating-current) motor of brushless type (hereinafter, simply referred to as a motor) specifically realizing a magnetic circuit configuration with simply configured loop windings (i.e., ring-shaped windings), using the processes such as of bending, molding and drawing an electromagnetic steel plate. The characteristics of the present invention may be prominent in realizing compact motors at low cost, in particular, with simplified structure and high performance.

Figure 1:
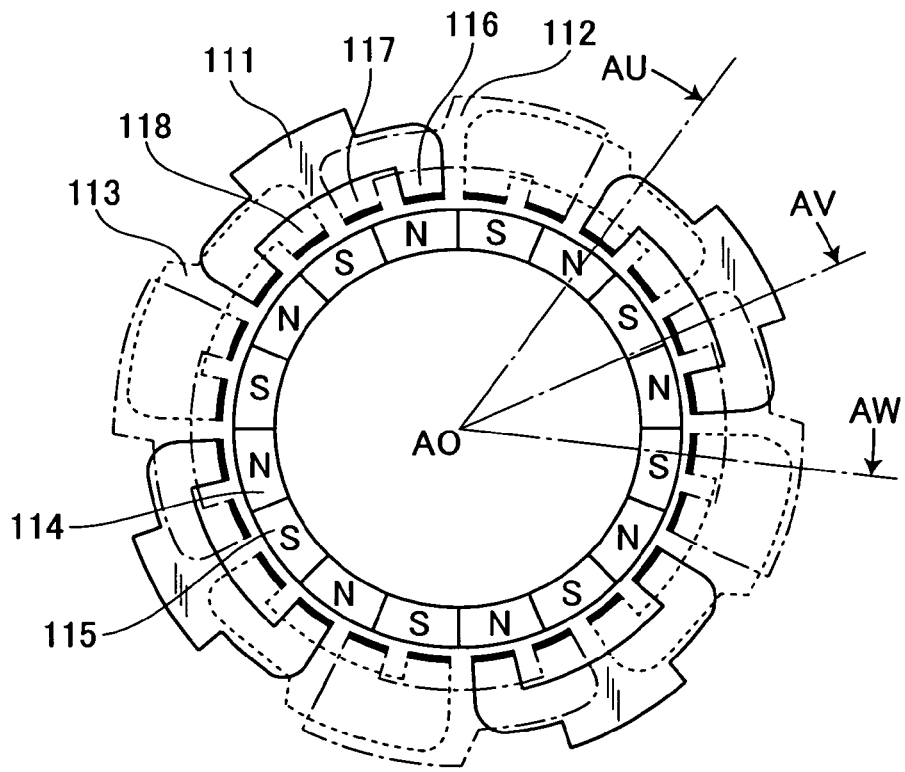
FIG. 1 is a horizontal cross section illustrating a three-phase sixteen-pole (magnetic pole) AC motor (brushless), according to an embodiment of the present invention.
Figure 5:
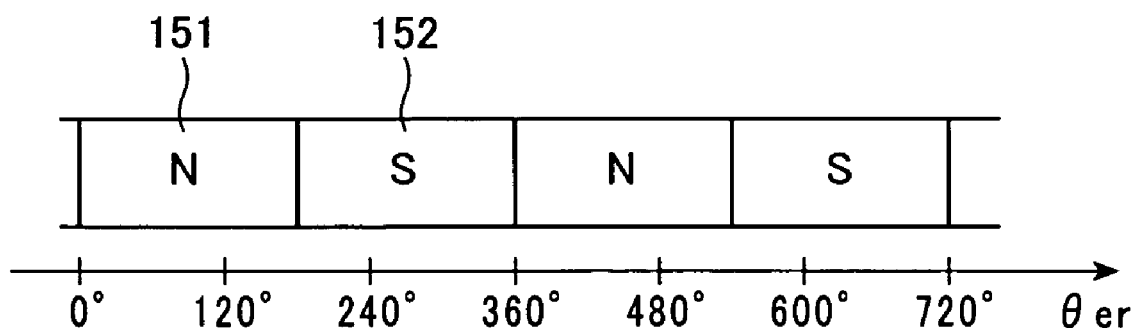
FIG. 5 is a diagram illustrating the circumferential electrical angular positions of N poles and S poles of the surface magnet rotor, according to the embodiment.

FIG. 1 shows a three-phase AC sixteen-pole brushless motor according to an embodiment of the present invention. In the figure, indicated by 114 are N-pole permanent magnet segments of the rotor and by 115 are S-pole permanent magnet segments of the rotor. FIG. 5 is a circumferential linear development illustrating an example of an arrangement of N poles (magnetic poles) 151 and S poles (magnetic poles) 152 of the rotor, with rotation angle in terms of electrical angle being indicated in the abscissa.

In FIG. 1, indicated by 116 is a U-phase stator pole, by 117 is a V-phase stator pole and by 118 is a W-phase stator pole. Eight sets of these stator poles of the three phases are arranged counterclockwise in FIG. 1 along the same circumference.

Figure 4:
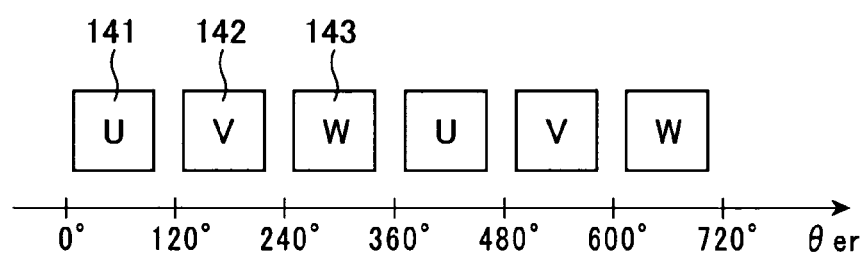
FIG. 4 is a diagram illustrating the circumferential electrical angular positions of the stator poles, according to the embodiment.

FIG. 4 is a circumferential linear development illustrating an example of an arrangement of U-phase stator poles 141, V-phase stator poles 142 and W-phase stator poles 143, with rotation angle in terms of electrical angle being indicated in the abscissa. The stator poles of the individual phases are located so as to face the N- and S-pole magnet segments 114 and 115 to generate torque with the electromagnetic attractive force and the repulsive force which are caused by the magnetomotive force induced by the motor current. Several configurations will be provided hereinafter to explain the connections of the three-phase stator poles with the magnetic paths on the side of the back yoke and the relationship between the loop windings and the currents passing through the windings. The electromagnetic action between the rotor and the stator depends on the correlation of these loop windings and the currents. It should be appreciated that, although a surface magnet rotor is shown in the figures, the present invention may also be applied to an integrated magnet rotor.

Figure 2:
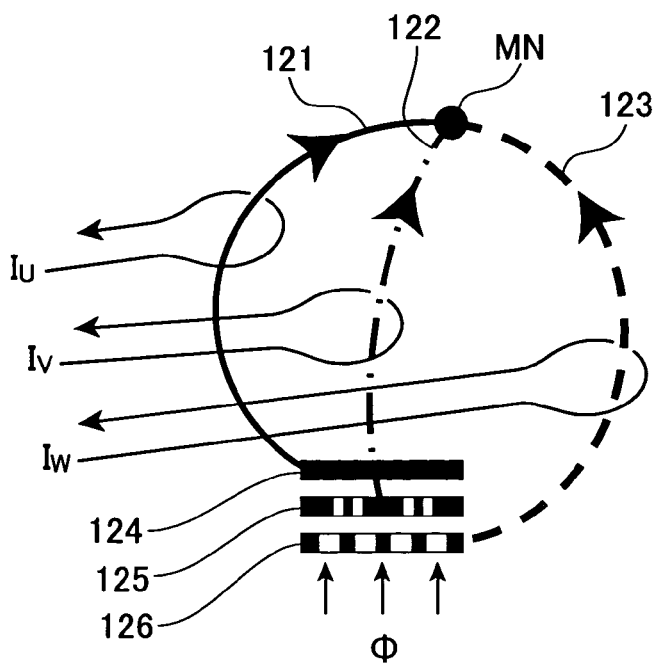
FIG. 2 is a diagram illustrating an interlinkage relationship between the magnetic flux of the three phases and the current of the three phases, according to the embodiment.

FIG. 2 qualitatively illustrates a relationship between the stator poles of the individual phases, the magnetic flux that passes through the stator poles and the three-phase motor currents. In the figure, indicated by 124 is a U-phase stator pole, by 125 is a V-phase stator pole and by 126 is a W-phase stator pole. These stator poles 124, 125 and 126 of the three phases correspond to the stator poles 116, 117 and 118, respectively, shown in FIG. 1 and are sequentially arranged on the same circumference of the motor. The permanent magnet assembly of the rotor supplies magnetic flux Φ for the opposed stator poles of the individual phases. Indicated by 121 is a U-phase magnetic path through which magnetic flux Φu passes. Indicated by 122 is a V-phase magnetic path through which magnetic flux Φv passes. Indicated by 123 is a W-phase magnetic path through which magnetic flux Φw passes. These three-phase magnetic fluxes Φu, Φv and Φw are converged at a magnetic flux conversion point MN where the sum of the fluxes becomes zero.

$$\Phi u + \Phi v + \Phi w = 0 \quad (4)$$

As shown in FIG. 2, the three-phase windings are wound such that the three-phase magnetic fluxes Φu, Φv and Φw interlink with the respective windings, with the three-phase currents Iu, Iv and Iw being passed through the windings. For example, the U-phase magnetic path 121 and the current Iu interlink with each other. In the case of balanced three-phase currents, the sum will be zero.

$$Iu + Iv + Iw = 0 \quad (5)$$

Figure 43:
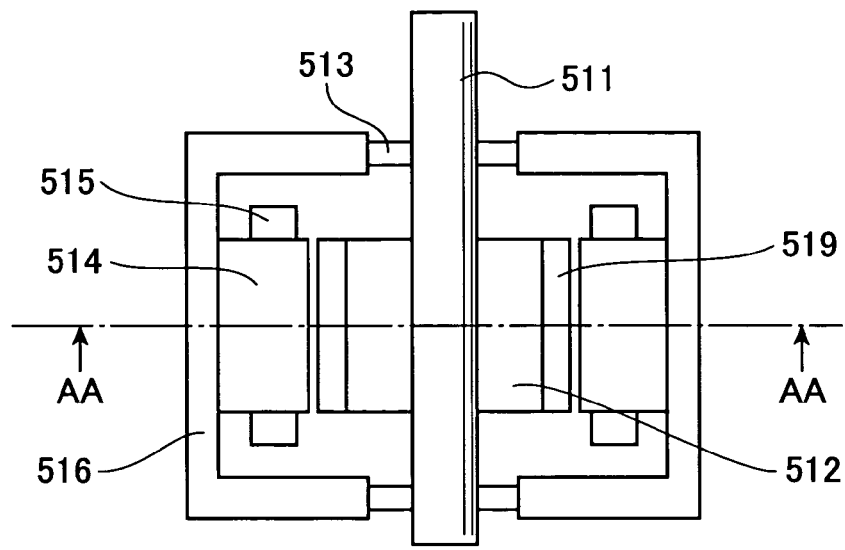
FIG. 43 is a vertical cross section illustrating a conventional brushless AC motor.
Figure 44:
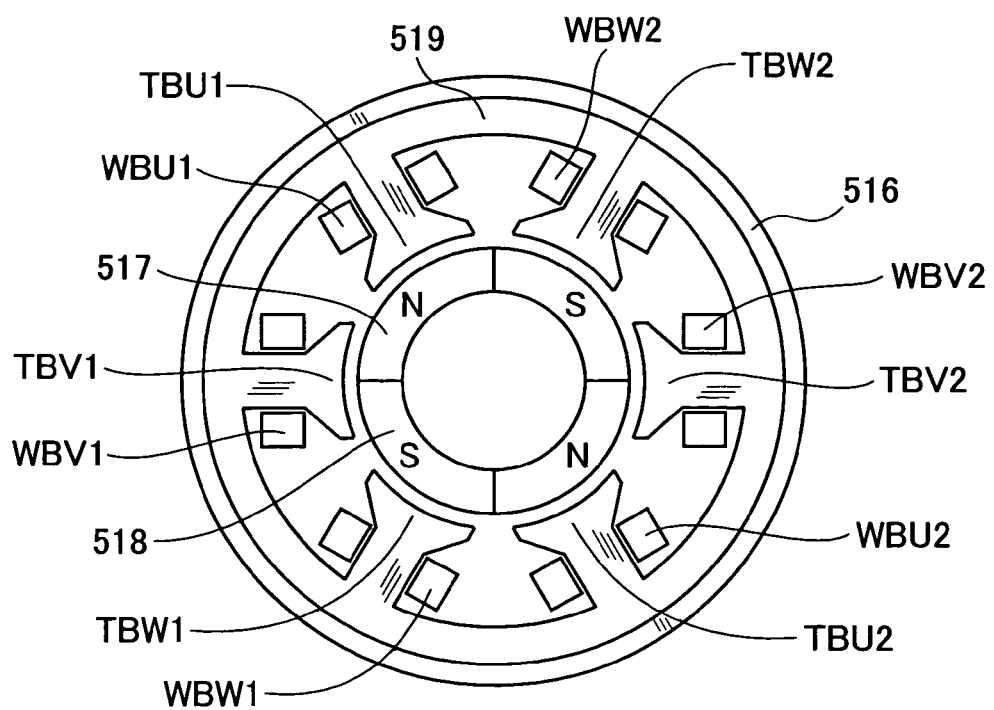
FIG. 44 is a horizontal cross section of the conventional brushless AC motor.
Figure 45:
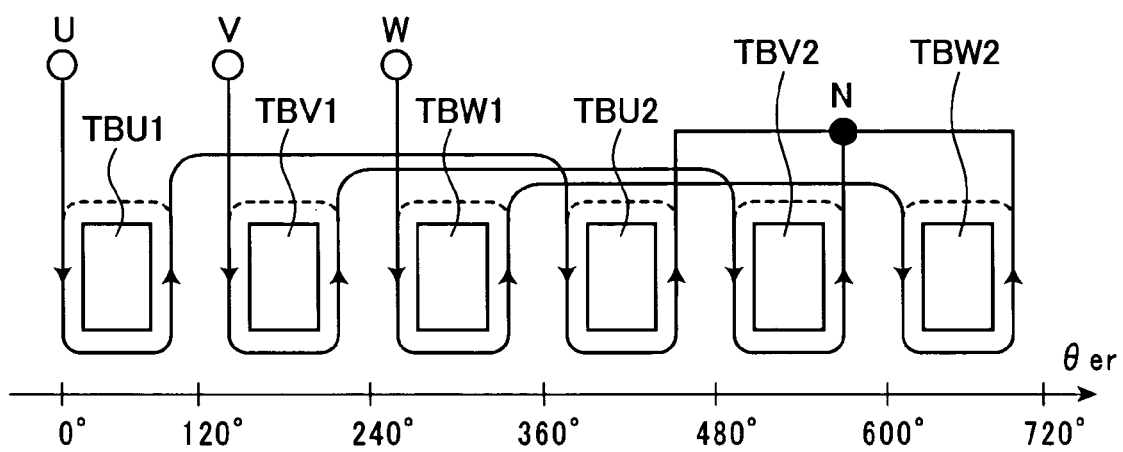
FIG. 45 is a winding diagram illustrating the conventional brushless AC motor.
Figure 47:
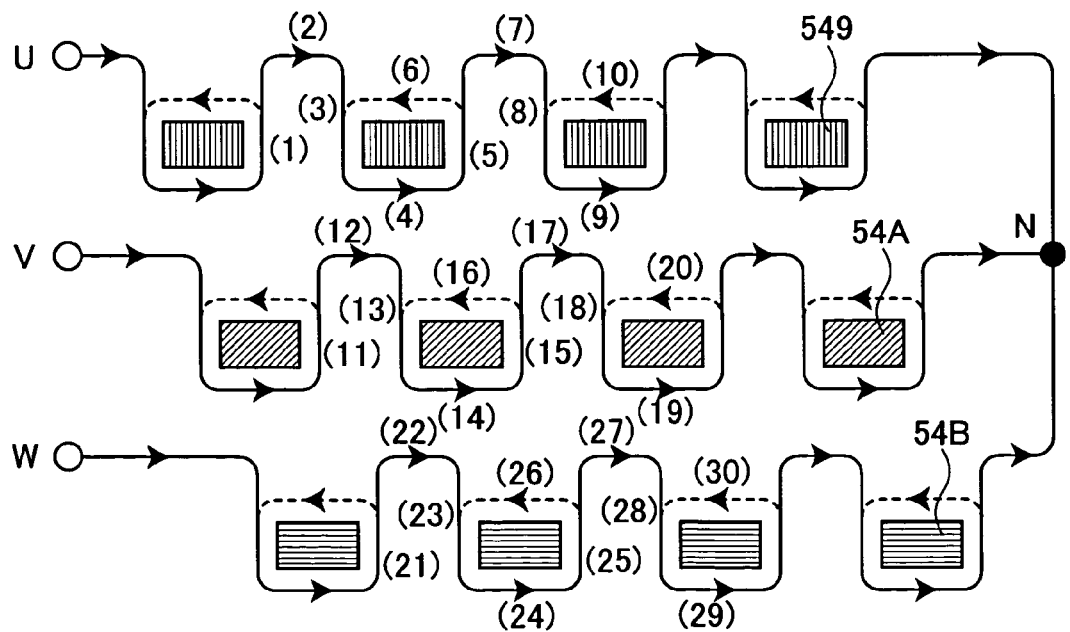
FIG. 47 is a diagram illustrating a relationship between stator poles and routing of windings.

The relationships expressed by Formulas (4) and (5) and FIG. 2 can also be applied to the conventional motors illustrated in FIGS. 43, 44 and 47. The establishment of the relationship shown in FIG. 2 can generate electromagnetic force between the stator poles 124, 125 and 126 of the individual phases, and the magnet segments 114 and 115 of the rotor.

Figure 6:
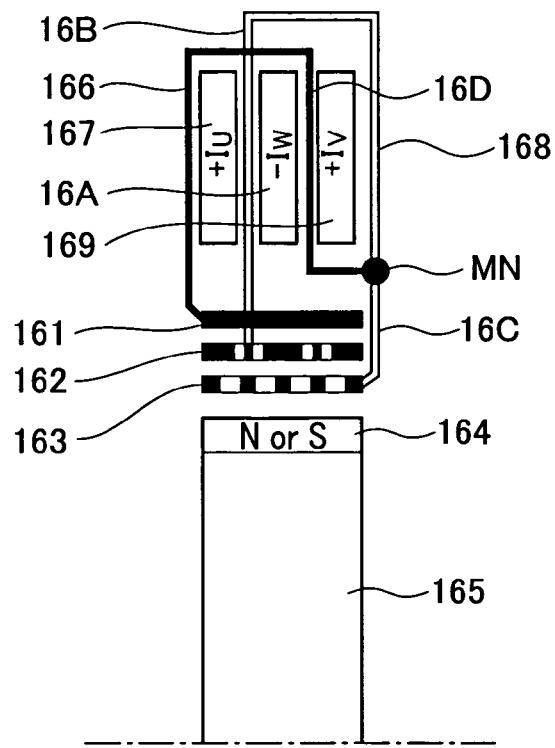
FIG. 6 is a schematic circumferential transparent cross section imaginarily illustrating the windings, the stator poles and the magnetic paths of the individual phases of the AC motor of the present invention.

FIG. 6 is a schematic circumferential transparent cross section imaginarily illustrating the motor illustrated in FIG. 1. In the figure indicated by 164 is a permanent magnet segment of the rotor and by 165 is a rotor. The lower side of the rotor 165 as viewed in the figure is the center of rotation of the rotor. Indicated by 161 is a U-phase stator pole, by 162 is a V-phase stator pole and by 163 is a W-phase stator pole. Since FIG. 6 illustrates a circumferential cross section, the stator poles of the three phases should be overlapped with each other. However, for convenience, the stator poles 161, 162 and 163 are indicated being vertically separated as viewed in the figure. With the illustration of FIG. 6, the conceptual relationship between the stator poles of the individual phases and the respective magnetic paths can be visually expressed.

Indicated by 167 is a U-phase loop winding through which the U-phase current Iu is passed. The U-phase current Iu interlinks with the U-phase magnetic flux Φu that passes through a magnetic path 166. Indicated by 169 is a V-phase loop winding through which the V-phase current Iv is passed. The V-phase current Iv interlinks with the V-phase magnetic flux Φv that passes through a magnetic path 16B. Indicated by 16A is a W-phase winding through which a negative W-phase current −Iw is passed. The negative W-phase current −Iw interlinks with the W-phase magnetic flux Φw that passes through a magnetic path 16C, the interlinking direction being reverse of other phases. Considering the relationship indicated by Formula (4), it may be the same in concept to take that the negative W-phase current −Iw interlinks with the U-phase magnetic flux Φu passing through the U-phase magnetic path 166 and the V-phase magnetic flux Φv passing through the V-phase magnetic path 16B. The positions of the stator poles and the magnetic paths are established for the respective three loop windings of the three phases, with the three-phase magnetic fluxes Φu, Φv and Φw being interlinked with the respective windings.

Referring now to FIGS. 3, 7, 8 and 9, hereinafter are described the magnetic paths of the phases shown in FIGS. 1 and 6 and the shape of the back yoke portion.

Figure 48A:
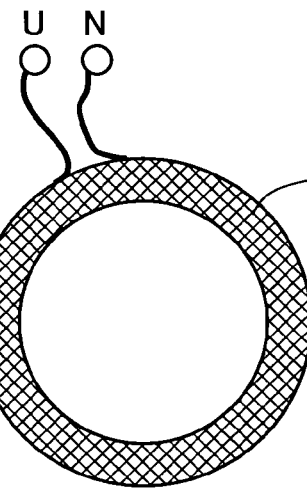
FIGS. 48A and 48B are diagrams each illustrating an outline of a loop winding.
Figure 48B:
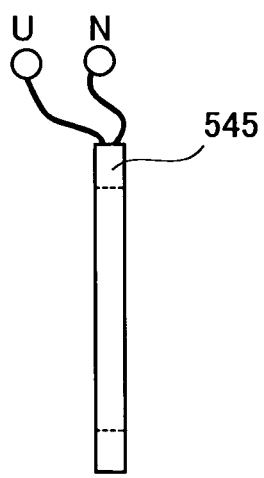
Figure 49:
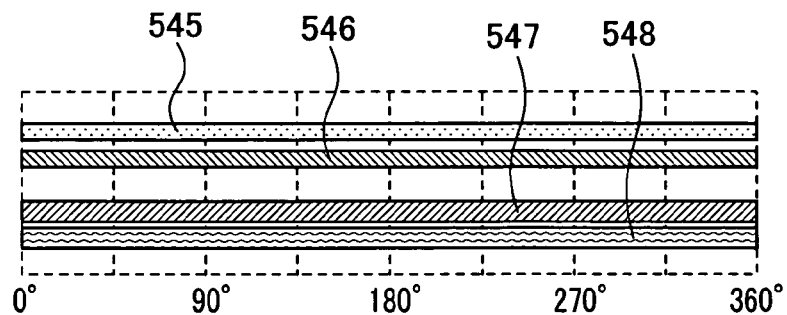
FIG. 49 is a linear development of the loop windings of the AC motor illustrated in FIG. 46.
Figure 50:
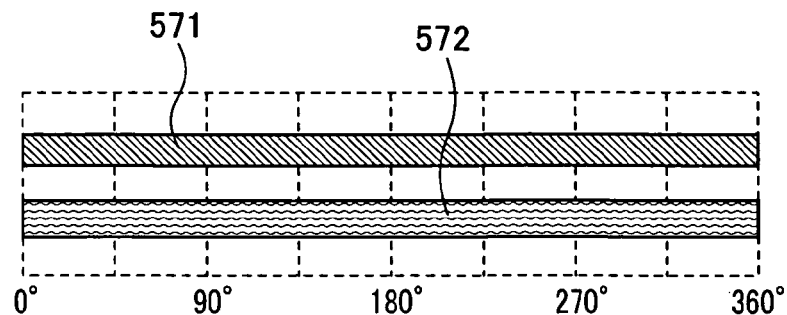
FIG. 50 is a linear development of the loop windings illustrated in FIG. 51.

Each of the loop windings 167, 169 and 16A shown in FIG. 6 has a simple structure as shown in FIG. 48. Therefore, the magnetic path of each of the phases will have a three-dimensional shape, or a complicated shape. The stator using such loop windings will not have a simple shape as in the case of the stator 519 of the conventional motor shown in FIG. 44, which is formed by axially stacking electromagnetic steel plates of the same shape. However, as far as compact motors are concerned, use of the loop windings can provide a stator core of mass productivity at low cost, in combination with an electromagnetic steel plate subjected to the processes of bending, molding, drawing, and the like.

Issues in realizing the three-phase magnetic paths shown in FIG. 6 include: ensuring a sufficiently large cross-sectional area in each of the magnetic paths of each phase, so that magnetic flux can pass therethrough without causing magnetic saturation; and reducing leakage of magnetic flux from between magnetic paths to a degree that will not cause inconvenience to the operation of the motor. If the magnetic paths of each phase are magnetically saturated, the magnetomotive force of the current of each phase will be unavoidably applied to the magnetically saturated portions. As a result, the peak torque of the motor will be reduced, necessitating the increase of the size of the motor. Also, if magnetic flux leakage from between the magnetic paths is increased, the power factor of the motor will be reduced to induce the magnetic saturation. As a result, the peak torque of the motor will be reduced, again necessitating the increase of the size of the motor.

Figure 3:
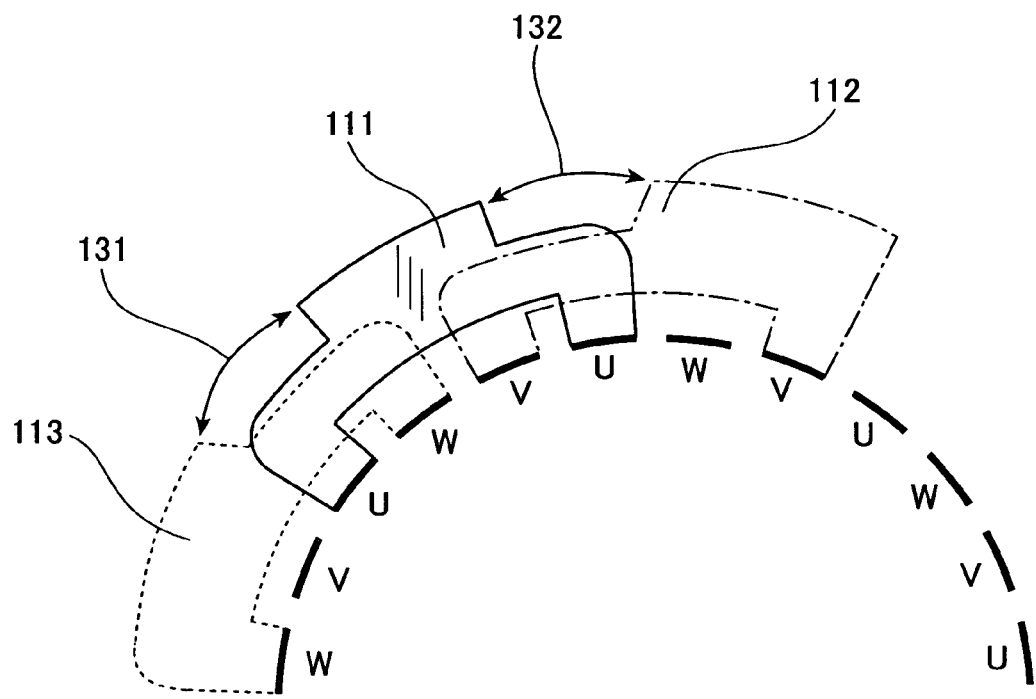
FIG. 3 is a diagram illustrating a combination relationship between the stator poles and the magnetic paths of the three phases, according to the embodiment.

As shown in FIG. 1 and in the partially enlarged view of FIG. 3, a specific approach for resolving the above issues may be combining two stator poles of the same phase so as to be suitable for a single magnetic path and increasing the space between the magnetic paths of the individual phases in the back yoke at the back of the stator. In FIG. 3, indicated by 111 is a U-phase magnetic path, by 112 is a V-phase magnetic path and by 113 is a W-phase magnetic path. As can be seen, intervals 131 and 132 between these magnetic paths are made large.

This configuration may ensure the intervals 131 and 132 to be large in the back yoke portion which would otherwise be crowded with magnetic paths, and thus may ensure the sufficiently large cross-sectional area in each magnetic path and enable reduction of magnetic flux leakage from between the magnetic paths of the individual phases. In FIGS. 1 and 3, the magnetic flux of two stator poles of the same phase is collected to a single magnetic path. Alternatively, magnetic flux of three or more stator poles of the same phase may be collected to a single magnetic path. In this case, the intervals between the magnetic paths can be made larger.

Figure 7:
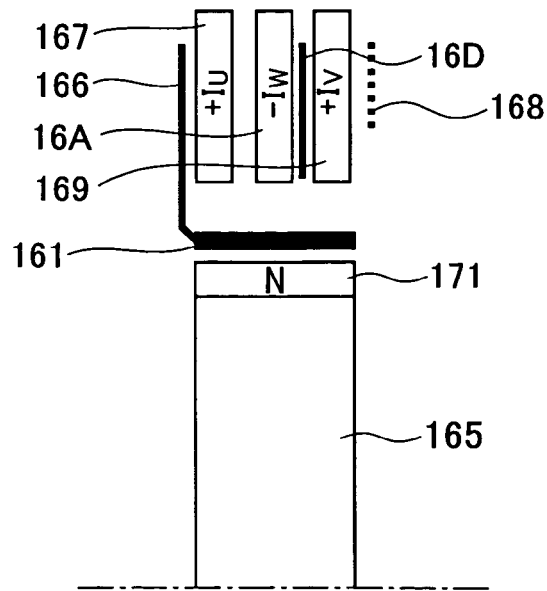
FIG. 7 is a cross section of the AC motor illustrated in FIG. 1.

FIG. 7 is a cross section taken along a line AU-AO of FIG. 1. In FIG. 7, indicated by 171 is an N-pole permanent magnet segment of the rotor. Indicated by 161 is a U-phase stator, by 166 is a U-phase magnetic path. Indicated by 16D is also a U-phase magnetic path which is magnetically connected to the path 166. Indicated by 168 is a magnetic path obtained after the W-phase stator pole 163 and the U-phase magnetic path 16D have been connected to each other. The magnetic path 168 also serves as a V-phase magnetic path. The connection relationship of all of these magnetic paths is shown in FIG. 6.

Figure 8:
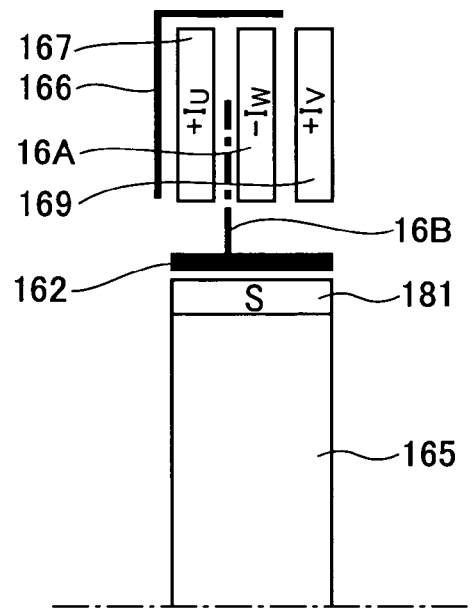
FIG. 8 is a cross section of the AC motor illustrated in FIG. 1.

FIG. 8 is a cross section taken along a line AV-AO of FIG. 1. In FIG. 8, indicated by 181 is an S-pole permanent magnet segment of the rotor. Indicated by 162 is a V-phase stator pole and by 16B is a V-phase magnetic path. Indicated by 166 is a U-phase magnetic path.

Figure 9:
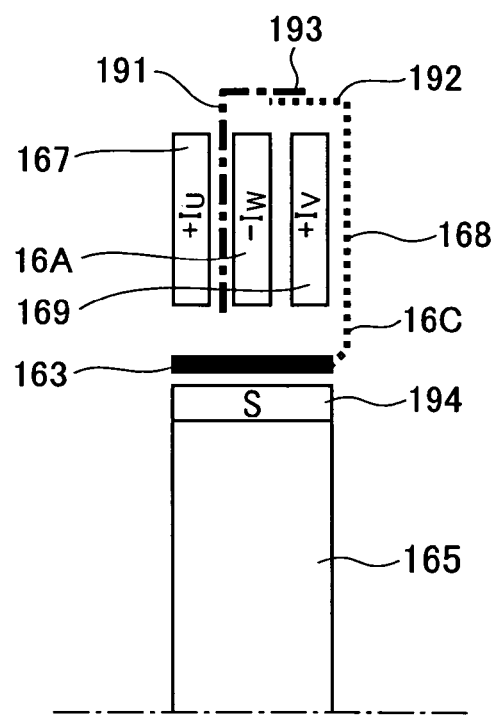
FIG. 9 is a cross section of the AC motor illustrated in FIG. 1.

FIG. 9 is a cross section taken along a line AW-AO of FIG. 1. In FIG. 9, indicated by 194 is an S-pole permanent magnet segment of the rotor. Indicated by 163 is a W-phase stator pole and by 16C is a W-phase magnetic path. Indicated by 191 is a V-phase magnetic path which ensures mutual passage of magnetic flux by having parts, as 193 and 192, of the electromagnetic steel plate been closely in contact with each other in parallel. It may be a little difficult to grasp the entire configuration from FIGS. 7, 8 and 9 each of which shows only a part of the cross section, but may be easier when seen combining FIGS. 1 and 6. As will be understood from the figures, it is configured such that the loop windings of the three phases will interlink with the respective magnetic paths and that the magnetic flux leakage will be reduced by making the intervals large between the magnetic paths.

Hereinafter will be described the electromagnetic action and characteristics of the motor shown in FIGS. 1 to 9. In this motor, which is provided with the three loop windings, the winding currents Iu, Iv and Iw interlink with the magnetic fluxes Φu, Φv and Φw, respectively. The motor model discussed here is a principle-based motor model including a surface magnet rotor that has a permanent magnet assembly on the surface thereof. Further, the motor model will be discussed here in a simplified fashion assuming that no leakage of magnetic flux is caused on the side of the stator, assuming the winding resistance to be zero, and assuming the iron loss of the soft magnetic material to be also zero.

Figure 51:
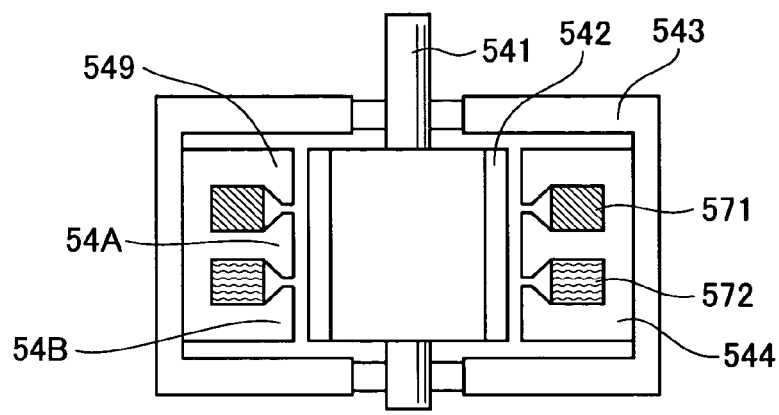
FIG. 51 is a vertical cross section of an AC motor having two loop windings obtained by combining the loop windings of the AC motor illustrated in FIG. 46.
Figure 52:
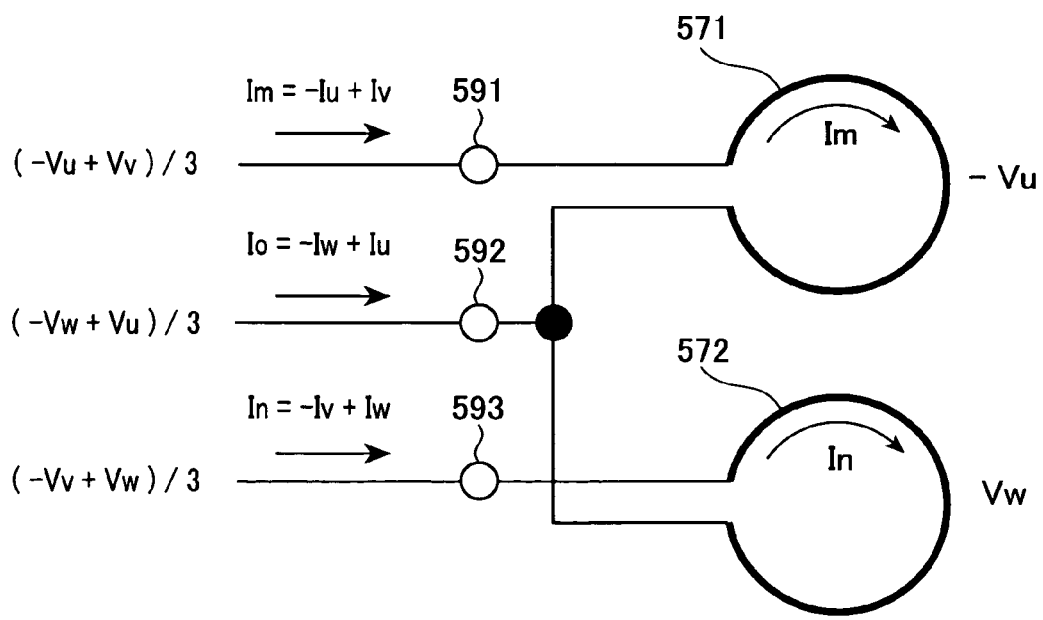
FIG. 52 is a diagram illustrating the currents, voltages, connecting terminals and a connection relationship between the loop windings of the AC motor illustrated in FIG. 51.

Meanwhile, the conventional motor having two loop windings as shown in FIGS. 51 and 52 will also be discussed. The currents of this motor can be expressed by Formulas (1) and (2). The current expressed by Formula (3) is applied as three-phase current in addition to these currents. The magnetic flux passing through the U-phase stator pole 549 from the side of the stator to the side of the rotor is the magnetic flux Φu, and the magnetic flux passing through the W-phase stator pole 54B from the side of the stator to the side of the rotor is the magnetic flux Φw. An input power and output power P2 in this case can be expressed as follows.

$$P2 = -d(\Phi u)/dt \times (-Iu + Iv) + d(\Phi w)/dt \times (-Iv + Iw) \quad (6)$$

$$= d(\Phi u) \times Iu + (-d(\Phi u)/dt - d(\Phi w)/dt)Iv + \quad (7)$$
$$d(\Phi w)/dt \times Iw$$
$$= d(\Phi u)/dt \times Iu + d(\Phi v)/dt \times Iv + d(\Phi w)/dt \times Iw$$

Subsequently, the operation and characteristics of the motor having the three loop windings shown in FIGS. 1 to 9 will be discussed in comparison with the motor having the two loop windings shown in FIGS. 51 and 52. A principle-based input power and output power P3 of the motor shown in FIG. 6 can be expressed as follows based on the relationship between the windings and the magnetic paths shown in FIG. 6.

$$P3 = d(\Phi u)/dt \times Iu + d(\Phi v)/dt \times Iv + d(-\Phi w)/dt \times (-Iw) \quad (8)$$

$$= d(\Phi u)/dt \times Iu + d(\Phi v)/dt \times Iv + d(\Phi w)/dt \times Iw$$

Formulas (7) and (8) will result in the same value, and therefore the input power and output power are the same in principle.

Subsequently, the copper loss is compared between these motors. When a cross-sectional area of each winding of the motor shown in FIG. 51 is S2, the number of turns is N2 and winding resistance is R2, Joule loss J2 of this motor can be expressed as follows.

$$J2 = (3^{-0.5} \times Io)^2 \times R2 \times 2 \quad (9)$$
$$= 6 \times (Io)^2 \times R2$$

Here, based on Formulas (1) and (2), the current passing through the two windings is set to $3^{-0.5}$ times of a phase current effective value Io.

On the other hand, regarding the windings of the motor shown in FIG. 6, assuming that the sum of the cross-sectional areas is the same as that of the motor shown in FIGS. 51 and 52, i.e. 2×S2, and that the number of turns N3 is also the same as that of the motor shown in FIGS. 51 and 52, i.e. N3=N2, resistance R3 of the phase windings will be 3/2 of R2.

$$R3 = 3/2 \times R2 \quad (10)$$

Joule loss J3 of the motor shown in FIG. 6 will be as follows.

$$J3 = (Io)^2 \times R3 \times 3 \quad (11)$$
$$= (Io)^2 \times 3/2 \times R2 \times 3$$
$$= 9/2 \times (Io)^2 \times R2$$

The Joule loss of Formula (11) is 75% of the Joule loss of Formula (9). This means that, compared to the motor shown in FIG. 51, the motor shown in FIG. 6 can reduce Joule loss by 25%, realizing high efficiency.

Joule loss is compared between the motors shown in FIGS. 43, 46, 51 and 6. When a motor having a flat shape and a small axial thickness is particularly concerned, the comparison between the above motors may result in as follows. Specifically, when compared to the motor of FIG. 43, the windings of the motor of FIG. 46 can be simplified and can be partially removed as explained referring to FIG. 47, and the motor of FIG. 46 may have less Joule loss.

Figure 46:
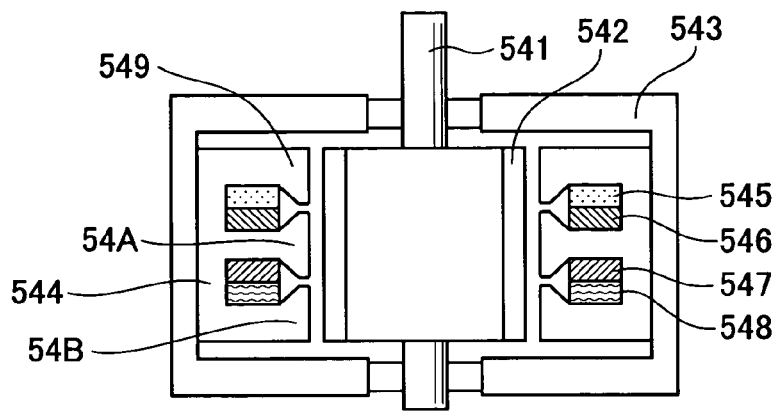
FIG. 46 is a vertical cross section of another conventional brushless AC motor.

Compared to the motor of FIG. 46, the motor of FIG. 51 enables application of composite current to a single winding and thus will have Joule loss reduced by 25%. As explained above, compared to the motor of FIG. 51, the Joule loss of the motor of FIG. 6 is smaller by 25%.

An issue concerning the unbalance of winding impedance in the motor shown in FIG. 51 will be discussed.

When there is a strong need of manufacturing compact motors at low cost, an inverter having a simple structure may be used for driving the motor. Also, such a motor may be driven with rectangular-waveform voltage without effecting pulse width modulation control (PWM control) to voltage. Further, such a motor may be driven without detecting the motor current, the rotational position of the motor and the speed. However, in such a compact motor, if it is a two-wire motor with three phases as shown in FIGS. 51 and 52, the impedance as seen from the input terminals of the three phases may be unbalanced. As a result, the three-phase current may be unbalanced, causing a problem of reducing the output and of inducing vibration and noise. In particular, voltage components of such a compact motor are likely to include a larger number of components of reducing impedance voltage than the number of inversely induced voltage components. Accordingly, the problem of unbalanced impedance may tend to be prominent in such a compact motor.

In this regard, with the windings of the motor of FIG. 6, the unbalance of impedance is so small that the problem of unbalance can be resolved. In addition, Joule loss can also be reduced by 25% in principle as described above. Accordingly, as far as a compact and flat motor is particularly concerned, the motor shown in FIG. 6 can be competitive. However, from the aspect of simplicity, the structure is more simplified in the motor shown in FIG. 23, which will be obtained, based on the motor of FIG. 51, by bending an electromagnetic steel plate. The motor of FIG. 23 will be described later.

Figure 10:
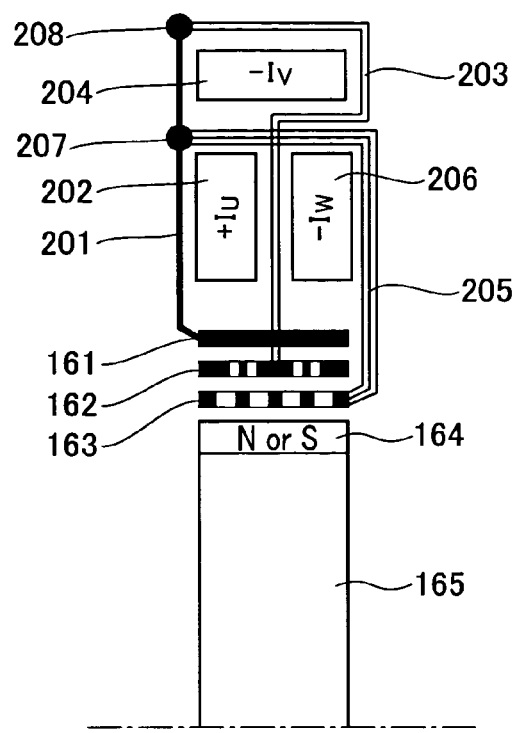
FIG. 10 is a diagram illustrating a modification of the AC motor illustrated in FIG. 6.

The configuration shown in FIG. 6 may be modified. FIG. 10 shows a modification of the configuration shown in FIG. 6.

In FIG. 10, indicated by 201 is a U-phase magnetic path and by 202 is a U-phase winding. Indicated by 203 is a V-phase magnetic path and by 204 is a V-phase winding. In phase V, since the direction of interlinkage of the magnetic flux is reverse of the phase U, the winding start and the winding end of the V-phase winding 204 is required to be reversed. In other words, this reversion is equivalent to passing a negative V-phase current −Iv through the V-phase winding 204. Indicated by 205 is a W-phase magnetic path and by 206 is a W-phase winding. Similar to phase V, a negative W-phase current −Iw is passed through the W-phase winding 206.

Figure 11:
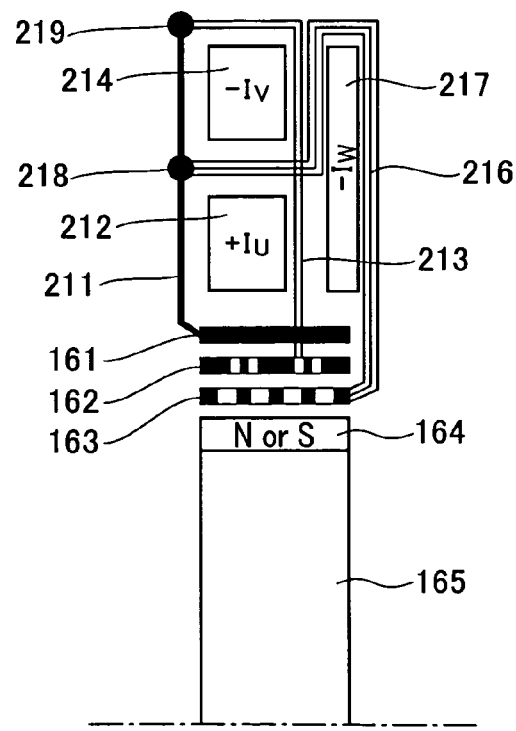
FIG. 11 is a diagram illustrating a modification of the AC motor illustrated in FIG. 6.

FIG. 11 shows a modification of the configuration shown in FIG. 6. Compared to the configuration of FIG. 10, the shapes have been changed in a V-phase winding designated with 214 and a W-phase winding designated with 217. In the figure, indicated by 211 is a U-phase magnetic path and by 212 is a U-phase winding. Indicated by 213 is a V-phase magnetic path and by 214 is a V-phase winding. Indicated by 216 is a W-phase magnetic path and by 217 is a W-phase winding. Indicated by 218 is a point where the U- and the V-phase magnetic paths converge. Indicated by 219 is a point where the V-phase magnetic path and other magnetic paths converge.

Hereinafter will be discussed a direction in which the magnetic flux and the current of each phase interlink with each other.

In the configurations shown in FIGS. 6, 10 and 11, it has been explained that any one of the phases has been passed with a negative current. This is because the direction of interlinkage of the magnetic flux with the winding is reversed in the phase in question from other phases. The reverse interlinkage with a winding may occur in some phase as a result of selecting a direction that makes simple the configuration of the magnetic path interlinking with the winding in the phase. Such a configuration may be practical because it will cause no particular problem and because the motor configuration is more simplified. However, since the sum of the three loop currents does not become zero, the magnetomotive force produced in the rotor shaft by the three-phase currents may cause such a problem that iron powder is likely to be attached to the rotor shaft. In an application that is not tolerant of such a problem, the configuration of the motor is required to be changed.

Figure 12:
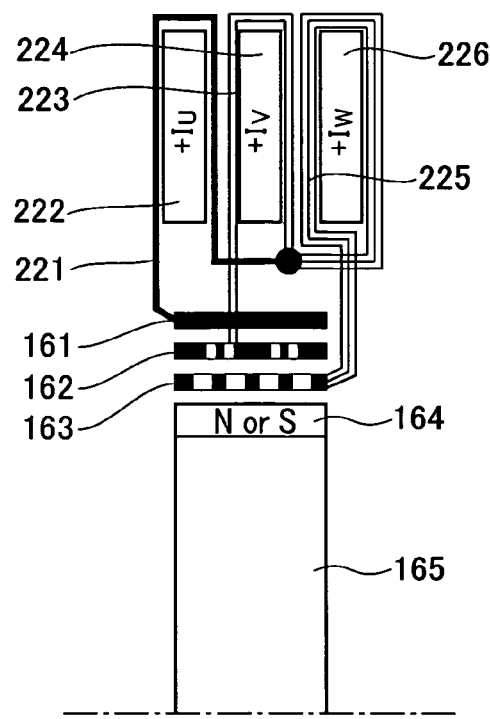
FIG. 12 is a diagram illustrating an example of an AC motor in which the winding direction of each winding in each of the three phases is permitted to coincide with the direction of the magnetic path interlinking with the winding.

As a measure to be taken against this problem, it is desirable to use the motor shown in FIG. 12. FIG. 12 shows a practical example of the motor shown in FIG. 1 in the form of a schematic circumferential transparent cross section imaginarily illustrating the motor. In the figure, indicated by 164 is a permanent magnet segment of the rotor and by 165 is a rotor. The lower side of the rotor 165 as viewed in the figure is the center of rotation of the rotor. Indicated by 161 is a U-phase stator pole, by 162 is a V-phase stator pole and by 163 is a W-phase stator pole. Since FIG. 12 illustrates a circumferential cross section, the stator poles of the three phases should be overlapped with each other. However, for convenience, the stator poles 161, 162 and 163 are indicated being vertically separated as viewed in the figure.

With the illustration of FIG. 12, the conceptual relationship between the stator poles of the individual phases and the respective magnetic paths can be visually expressed. Indicated by 221 is a U-phase magnetic path and by 222 is a U-phase winding through which the U-phase current Iu is passed. Indicated by 223 is a V-phase magnetic path and by 224 is a V-phase winding through which the V-phase current Iv is passed. Indicated by 225 is a W-phase magnetic path and by 226 is a W-phase winding through which the W-phase current Iw is passed. The interlinkage relationship between the magnetic path and the winding is the same between the phases. With this configuration, the magnetomotive force axially produced in the rotor by the three-phase loop windings is zeroed because the sum of all of the currents is zero. Specifically, since no magnetomotive force is produced in the rotor output shaft, or the like, there is no such problem as permitting attachment of iron power to the rotor output shaft. However, there may be a problem of making the configuration of the three-phase magnetic paths slightly complicated.

Figure 13:
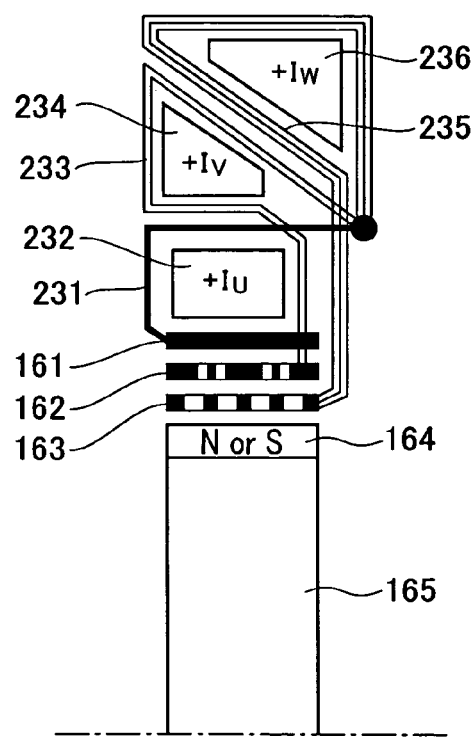
FIG. 13 is a diagram illustrating a modification of the AC motor illustrated in FIG. 12.

FIG. 13 is a modification of the motor configuration illustrated in FIG. 12. In the modification shown in FIG. 13, the only change in the arrangement from the one shown in FIG. 12 has accompanied the change in the shapes of the components. From the viewpoint of facilitating manufacture, the shapes of components constitute an important factor of design. In FIG. 13, indicated by 231 is a U-phase magnetic path and by 232 is a U-phase winding through which the U-phase current Iu passes. Indicated by 233 is a V-phase magnetic path and by 234 is a V-phase winding through which the V-phase current Iv passes. Indicated by 235 is a W-phase magnetic path and by 236 is a W-phase winding through which the W-phase current Iw passes.

Figure 14:
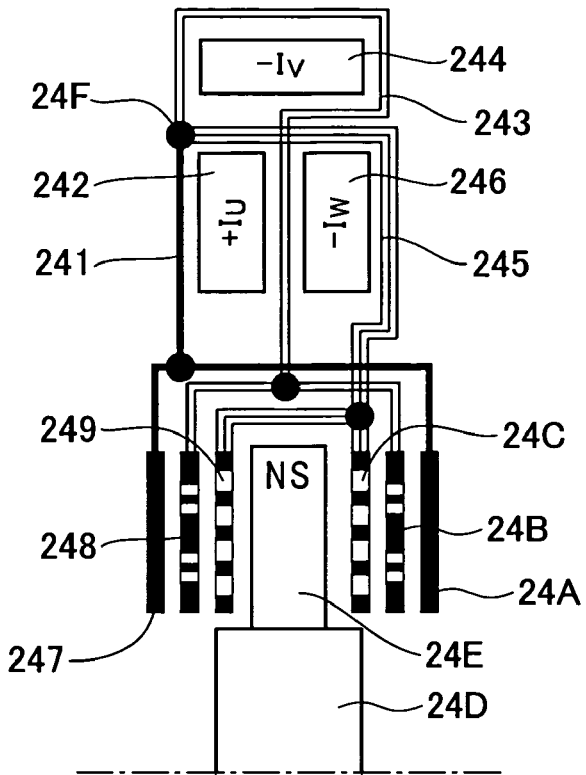
FIG. 14 is a diagram illustrating an example of a three-phase AC motor that uses both of the front-side magnetic flux and the rear-side magnetic flux of a permanent magnet assembly.

Referring now to FIG. 14, hereinafter is described a motor configuration using magnetic flux Φo of the front face of a permanent magnet assembly (hereinafter referred to as "front-face magnetic flux Φo") and magnetic flux Φs of the rear face of the permanent magnet assembly (hereinafter referred to as "rear-face magnetic flux Φs"). The motor shown in FIG. 14 is configured such that magnetic flux which is larger, by a factor of two, than that of each of the motors above can interlink with each winding. Accordingly, the motor shown in FIG. 14 can generate torque which is larger, by a factor of two, than that of each of the motors described above.

Figure 15:
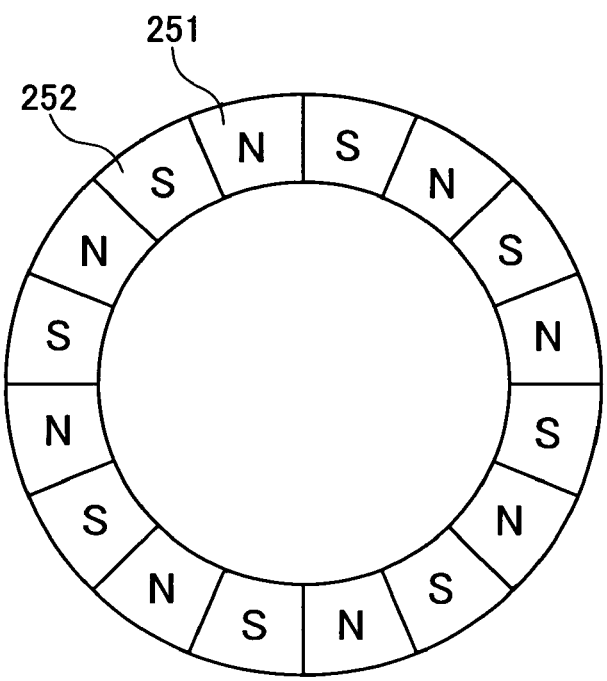
FIG. 15 is a diagram illustrating the shape of the permanent magnet assembly of the rotor.

FIG. 14 is a schematic circumferential transparent cross section imaginarily illustrating a three-phase sixteen-pole motor. In the figure, indicated by 24E are permanent magnet segments of the rotor, by 24D is the rotor. The lower side of the rotor 24D as viewed in the figure is the center of rotation of the rotor. The permanent magnet segments 24E in the entirety thereof has a disk-like shape as shown in FIG. 15 and are magnetized into sixteen poles. The front face of a segment 251 is an N pole and the rear face thereof is an S pole. The front face of a segment 252 is an S pole and the rear face thereof is an N pole.

Indicated by 247 is a U-phase stator pole, by 248 is a V-phase stator pole and by 249 is a W-phase stator pole. These stator poles are arranged in the circumferential direction with a phase difference of 120° in electrical angle therebetween. Each of the phases has eight stator poles on the circumference. The stator poles 247, 248 and 249, which are arranged on the same circumference, should be drawn being overlapped with each other in the transparent view. However, for convenience, these stator poles are indicated being vertically separated as viewed in the figure.

Indicated by 24A is a U-phase stator pole which is arranged with a circumferential phase difference of 180° in electrical angle from the stator pole 247. Accordingly, the U-phase stator poles 247 and 24A are passed with the magnetic flux of the same phase and magnetically connected to a U-phase magnetic path 241. Indicated by 242 is a U-phase loop winding which is interlinked with the U-phase magnetic path 241 and passes the U-phase current Iu.

Indicated by 24B is a V-phase stator pole which is arranged with a circumferential phase difference of 180° in electrical angle from the stator pole 248. Accordingly, the V-phase stator poles 248 and 24B are passed with the magnetic flux of the same phase and magnetically connected to a V-phase magnetic path 243. Indicated by 244 is a V-phase loop winding which is interlinked with the V-phase magnetic path 243. Since the relationship between the magnetic flux and the magnetic path is reversed from that of the phase U, the V-phase loop winding 244 passes a V-phase negative current −Iv.

Indicated by 24C is a W-phase stator pole which is arranged with a circumferential phase difference of 180° in electrical angle from the W-phase stator pole 249. Accordingly, the W-phase stator poles 249 and 24C are passed with the magnetic flux of the same phase and magnetically connected to a W-phase magnetic path 245. Indicated by 246 is a W-phase loop winding which is interlinked with the W-phase magnetic path 245. Since the relationship between the magnetic flux and the magnetic path is reversed from that of the phase U, the W-phase loop winding 246 passes a negative W-phase current −Iw.

Figure 17:
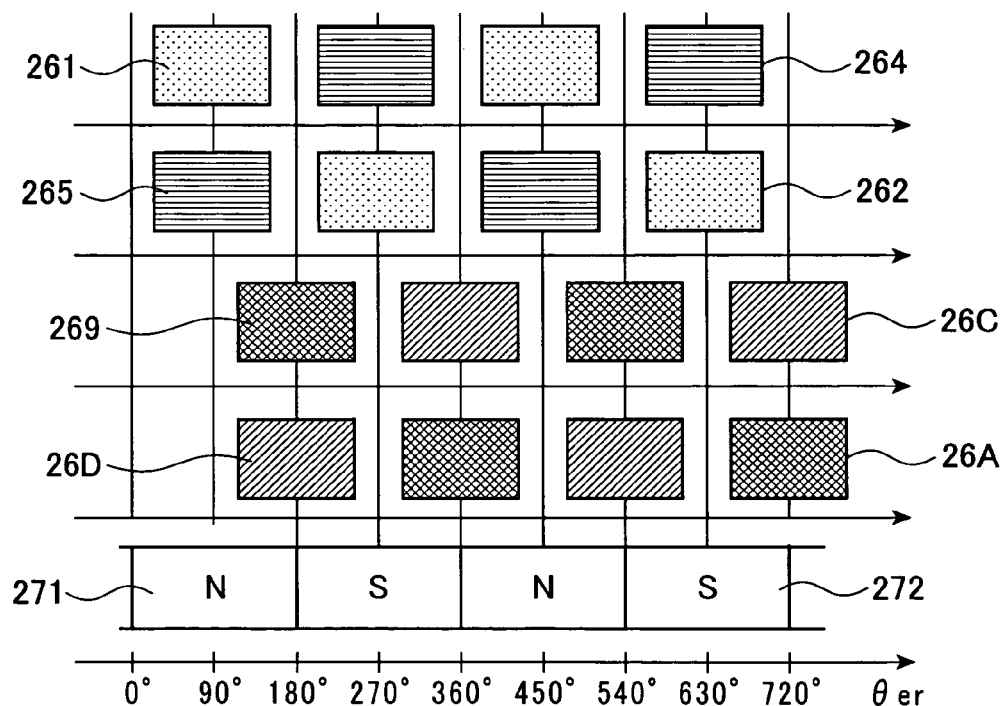
FIG. 17 is a diagram illustrating in terms of electrical angle a relationship between the N- and S-pole permanent magnet segments of the rotor and the circumferential positions of the stator poles of the individual phases of the AC motor illustrated in FIG. 16.

FIG. 17 illustrates an example of the rotational positions of the permanent magnet segments and the rotational angular positions of the stator poles, with the abscissa indicating rotational angle her in terms of electrical angle. Specifically, FIG. 17 is a linear development of the permanent magnet segments having a disk-like shape as a whole as shown in FIG. 15 in relation to the stator poles. The relationship between the U-phase stator poles 247 and 24A in FIG. 14 corresponds to the relationship between stator poles 261 and 262 in FIG. 17. Specifically, the U-phase stator poles 247 and 24A are positioned on the front and rear sides, respectively, of the permanent magnet with the rotational angular positions being circumferentially offset by 180° in electrical angle.

Figure 16:
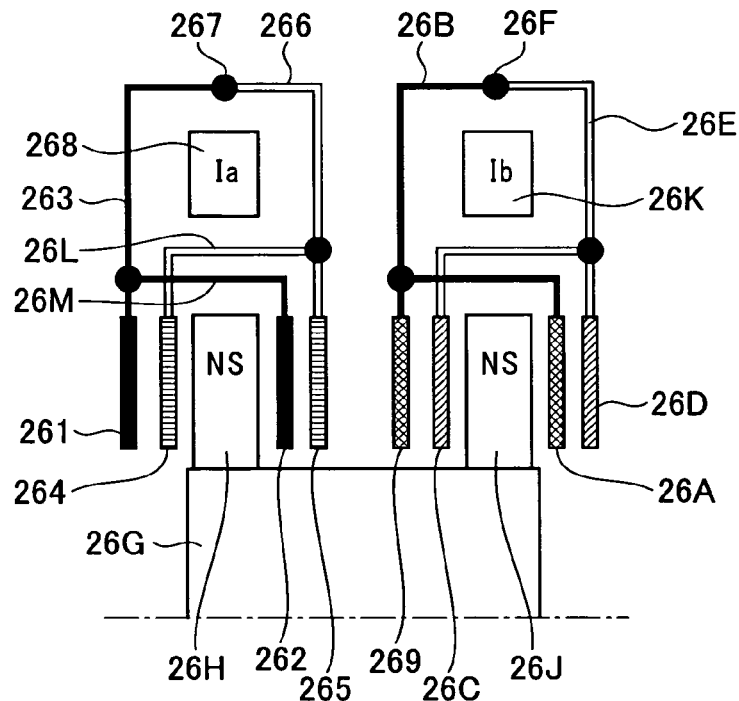
FIG. 16 is a diagram illustrating an example of a two-phase AC motor that uses both of the front-side magnetic flux and the rear-side magnetic flux of a permanent magnet assembly.

Referring to FIG. 16, an example of a two-phase motor will be described.

FIG. 16 is a schematic circumferential transparent cross section imaginarily illustrating a two-phase sixteen-pole motor. In the figure, indicated by 26H and 26J each are permanent magnet segments of the rotor having a disk-like shape as a whole as shown in FIG. 15 and magnetized into sixteen poles. Indicated by 26G is the rotor in which the lower side of the rotor as viewed in the figure is the center of rotation of the rotor.

Indicated by 261 is an A-phase stator pole and by 264 is an A/-phase stator pole having a phase which is reverse of the stator pole 264. The A- and A/-phase stator poles 261 and 264 are arranged with a mutual circumferential phase difference of 180° in electrical angle. Eight stator poles are circumferentially arranged in each of the phases. Since the stator poles 261 and 264 are arranged on the same circumference, the shapes of the stator poles 261 and 264 in the circumferential transparent view should normally be drawn being overlapped with each other. However, for convenience, the stator poles 261 and 264 are indicated being vertically separated as viewed in the figure.

Indicated by 262 is an A-phase stator pole which is arranged with a circumferential phase difference of 180° in electrical angle from the stator pole 261. Accordingly, the A-phase stator poles 261 and 262 are passed with the magnetic flux of the same phase and magnetically connected to an A-phase magnetic path 263. Indicated by 268 is an A-phase loop winding interlinked with the A-phase magnetic path 263, or an A-phase magnetic flux Φa, to pass an A-phase current Ia. The A-phase stator poles 261 and 262 are also indicated in FIG. 17 with the same reference numerals 261 and 262, respectively.

Indicated by 265 is an A/-phase stator pole having a phase reverse of the phase A and arranged with a circumferential phase difference of 180° in electrical angle from the A/-phase stator pole 264. Accordingly, the A/-phase stator poles 264 and 265, each having a phase reverse of the phase A, are passed with the magnetic flux of the same phase and magnetically connected to an A/-phase magnetic path 266. The A/- and A-phase magnetic paths 266 and 263 are mutually connected at a connecting point 267. The A/-phase stator poles 264 and 265 of FIG. 16 are also indicated in FIG. 17 with the same reference numerals 264 and 265, respectively.

A phase B shown in the right half of FIG. 16 has a configuration similar to the phase A in the left half.

Indicated by 269 is a B-phase stator pole and by 26C is a B/-phase stator pole having a phase which is reverse of the phase B. The B- and B/-phase stator poles 269 and 26C are arranged in the circumferential direction with a mutual phase difference of 180° in electrical angle. Eight stator poles are arranged in each of the phases. Since the stator poles 269 and 26C are arranged on the same circumference, the shapes of the stator poles 269 and 26C in the circumferential transparent view should normally be drawn being overlapped with each other. However, for convenience, the stator poles 269 and 26C are indicated being vertically separated as viewed in the figure.

Indicated by 26A is a B-phase stator pole which is arranged with a circumferential phase difference of 180° in electrical angle from the stator pole 269. Accordingly, the B-phase stator poles 269 and 26A are passed with the magnetic flux of the same phase and magnetically connected to a B-phase magnetic path 26B. Indicated by 26K is a B-phase loop winding interlinked with the B-phase magnetic path 26B, or a B-phase magnetic flux Φb, to pass a B-phase current Ib.

The B-phase stator poles 269 and 26A of FIG. 16 are also indicated in FIG. 17 with the same reference numerals 269 and 26A, respectively. Indicated by 26D is a B/-phase stator pole having a phase reverse of the phase B and arranged with a circumferential phase difference of 180° in electrical angle from the stator pole 26C. Accordingly, the B/-phase stator poles 26C and 26D, each having a phase reverse of the phase B, are passed with the magnetic flux of the same phase and magnetically connected to a B/-phase magnetic path 26E. The B/- and B-phase magnetic paths 26E and 26B are mutually connected at a connecting point 26F. The B/-phase stator poles 26C and 26D of FIG. 16 are also indicated in FIG. 17 with the same reference numerals 26C and 26D, respectively. N poles 271 and S poles 272 on the surface of the permanent magnet assembly in FIG. 17 are as viewed from the side of the stator poles 261 and 264.

The configuration described referring to FIGS. 1, 3 and 6 has been obtained by processing an electromagnetic steel plate using bending, molding, drawing, and the like. Similarly, the specific configuration of each of the magnetic paths 263, 266, 26E and 26B shown in FIG. 16 can also be obtained through these processes. For example, as has been shown in FIG. 3, the magnetically closely located magnetic paths 26L and 26M in FIG. 16 can be configured into paths with large distance therebetween and with small magnetic flux leakage, by collecting the magnetic fluxes of two or more stator poles of the same phase, followed by having them intersected with each other.

Similar to the ordinarily used two-phase motors, the phases A and B of FIG. 16 can each generate torque having a phase difference of 90° with an electrical angular cycle of 180°. Therefore, the sum of the torque of both of the phases is logically constant to thereby enable generation of torque having small torque ripple. Also, the two-phase motor shown in FIGS. 16 and 17 can produce large magnetic flux that interlinks with each of the loop windings 268 and 26K to thereby enable generation of large torque. Also, compared to the motor shown in FIG. 14, the two-phase motor shown in FIGS. 16 and 17 has the magnetic paths each being partially slightly simplified. As a result, a compact motor having good productivity can be realized at low cost.

Figure 18:
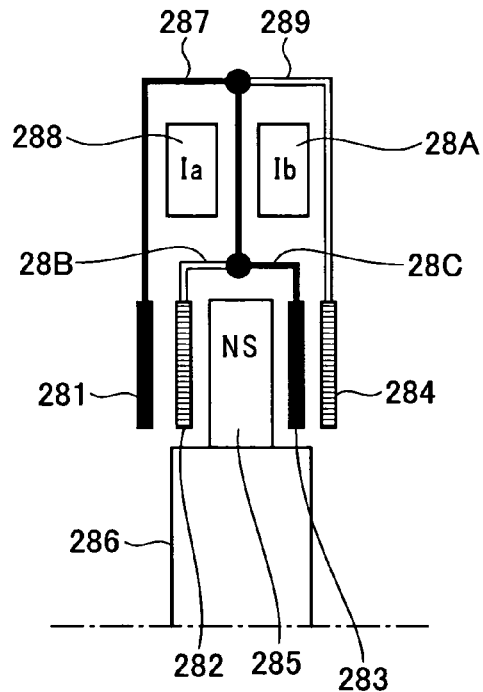
FIG. 18 is a diagram illustrating an example of a two-phase AC motor that uses both of the front-side magnetic flux and the rear-side magnetic flux of a permanent magnet assembly.

Referring to FIG. 18, hereinafter is described an example of a more simplified two-phase motor.

FIG. 18 is a schematic circumferential transparent cross section imaginarily illustrating a two-phase sixteen-pole motor. In the figure indicated by 285 are permanent magnet segments having a disk-like shape as a whole similar to the permanent magnet assembly shown in FIG. 15 and magnetized into sixteen poles. Indicated by 286 is the rotor in which the lower side of the rotor as viewed in the figure is the center of rotation of the rotor.

Indicated by 281 is an A-phase stator pole and by 282 is an A/-phase stator pole which reverse of the phase A. The stator poles 281 and 282 are arranged with a mutual circumferential phase difference of 180° in electrical angle. Eight poles are arranged for each of the phases. Since the stator poles 281 and 282 are arrange on the same circumference, the shapes of the stator poles 281 and 282 in the circumferential transparent view should normally be drawn being overlapped with each other. However, for convenience, the stator poles 281 and 282 are indicated being vertically separated as viewed in the figure.

A-phase magnetic flux Φa passes through the A-phase stator pole 281. Indicated by 288 is an A-phase loop winding that interlinks with an A-phase magnetic path 287 and passes the A-phase current Ia. Similarly, indicated by 284 is a stator pole with a phase reverse of the phase B and passes a magnetic flux −Φb. Indicated by 28A is a B-phase winding that interlinks with a magnetic path 289 having a phase reverse of the A-phase winding. Since the magnetic flux of the magnetic path 289 is the magnetic flux φb, the current passing through the winding 28A is the B-phase current Ib.

Indicated by 282 is the A/-phase stator pole, as mentioned above, having a phase reverse of the phase A, and by 283 is a B-phase stator pole. Both of the A/- and B-phase stator poles 282 and 283 are magnetically connected to magnetic paths 28B and 28C, respectively. As shown in FIG. 18, the magnetic paths 28B and 28C are magnetically connected to the magnetic paths 287 and 289, respectively. With the connection of all of these four magnetic paths being established, the sum of the magnetic flux is zeroed.

Figure 19:
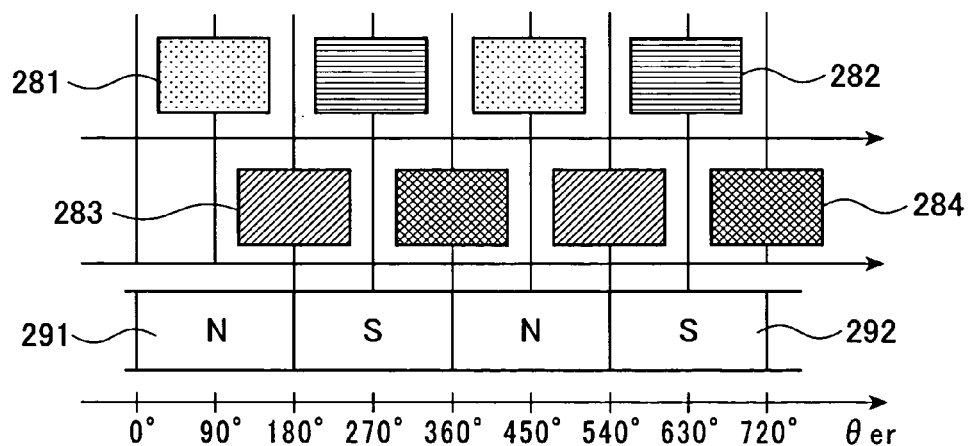
FIG. 19 is a diagram illustrating in electrical angle a relationship between the N- and S-pole permanent magnet segments of the rotor and the circumferential positions of the stator poles of the individual phases of the AC motor illustrated in FIG. 18.

FIG. 19 is a linear development of the stator poles and the permanent magnet segments of FIG. 18 to indicate a positional relationship therebetween. Indicated by 291 and 292 are N- and S-poles of the permanent magnet segments 285 as viewed from the side of the stator poles 281 and 282. The abscissa indicates rotational angular position θer in terms of electrical angle. The positional relationship between the stator poles 281, 282, 283 and 284 of FIG. 18 is shown in FIG. 19 with the same reference numerals.

Although the magnetic flux interlinked with the windings is small in the two-phase motor shown in FIG. 18 compared to the two-phase motor shown in FIG. 16, the motor shown in FIG. 18 is characterized in the simple configuration and good productivity. Alternative to this configuration, only the magnetic paths 287 and 28B may be magnetically connected, with the winding 288 being interlinked with the magnetic paths, while only the magnetic paths 28C and 289 are magnetically connected, with the winding 28A being interlinked with the magnetic paths. This alternative configuration may fall within the scope of the degree of freedom of the parts of the motor.

Figure 20:
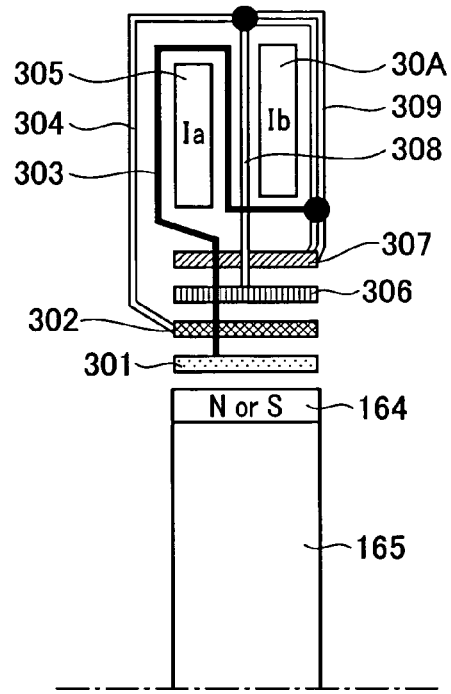
FIG. 20 is a diagram illustrating a two-phase AC motor configured by four types of stator poles and two loop windings (i.e., two ring-shaped windings)

Referring to FIG. 20, the configuration of another two-phase motor will be described.

FIG. 20 is a schematic circumferential transparent cross section imaginarily illustrating a two-phase sixteen-pole motor. The rotor has the same configuration as the rotor illustrated in FIG. 6.

In the figure, indicated by 301 is an E-phase stator pole, by 302 is an F-phase stator pole, by 306 is a G-phase stator pole and by 307 is an H-phase stator pole. Since the stator poles 301, 302, 306 and 307 are arranged on the same circumference, the shapes of these stator poles in the circumferential transparent view should normally be drawn being overlapped with each other. However, for convenience, the stator poles are indicated being vertically separated as viewed in the figure.

Figure 21:
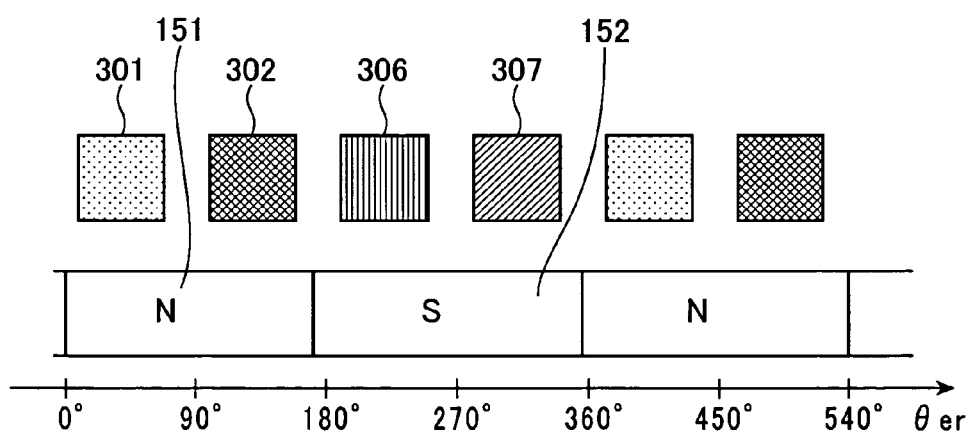
FIG. 21 is a diagram illustrating in electrical angle a relationship between the N- and S-pole permanent magnet segments of the rotor and the circumferential positions of the stator poles of the individual phases of the AC motor illustrated in FIG. 20.

The rotational positions of the stator poles 301, 302, 306 and 307 of FIG. 20 are indicated in FIG. 21 with the same reference numerals.

FIG. 21 is a linear development of the permanent magnet segments and the stator poles shown in FIG. 20 to indicate the relationship therebetween. The abscissa indicates the rotational position of the rotor in terms of electrical angle. In the figure, indicated by 151 are N-pole permanent magnet segments and by 152 are S-pole permanent magnet segments. The stator poles of the four phases mentioned above are arranged within an electrical angle of 360°.

The total of the magnetic flux of the E- and F-phase stator poles 301 and 302 corresponds to the interlinked magnetic flux of the phase A of the motor shown in FIGS. 18 and 19. The total of the magnetic flux of the F- and G-phase stator poles 302 and 306 corresponds to the interlinked magnetic flux of the phase B of the motor shown in FIGS. 18 and 19. In FIG. 20, indicated by 305 is an A-phase winding interlinked with magnetic paths 303 and 304 and passing the A-phase current Ia. Indicated by 30A is a B-phase winding interlinked with magnetic paths 309 and 308 and passing the B-phase current Ib. The relationship between the components in FIG. 20 is analogous to the relationship shown in FIG. 18.

The configuration described referring to FIGS. 1, 3 and 6 has been obtained by processing an electromagnetic steel plate using bending, molding, drawing, and the like. Similarly, the specific configuration of each of the magnetic paths 303, 304, 308 and 309 shown in FIG. 20 can also be obtained through these processes. An issue here is again the reduction of the magnetic flux leakage the portions where the magnetic paths of the individual phases are closely located. Thus, it is required to provide an arrangement and configuration in which two or more magnetic fluxes of the same phase are collected to a single magnetic path, for interlinkage with the windings mentioned above. The motor shown in FIG. 20 is a simply configured two-phase motor which is able to realize the reduction of size and cost.

Hereinafter is discussed a method of driving a two-phase motor.

Figure 22:
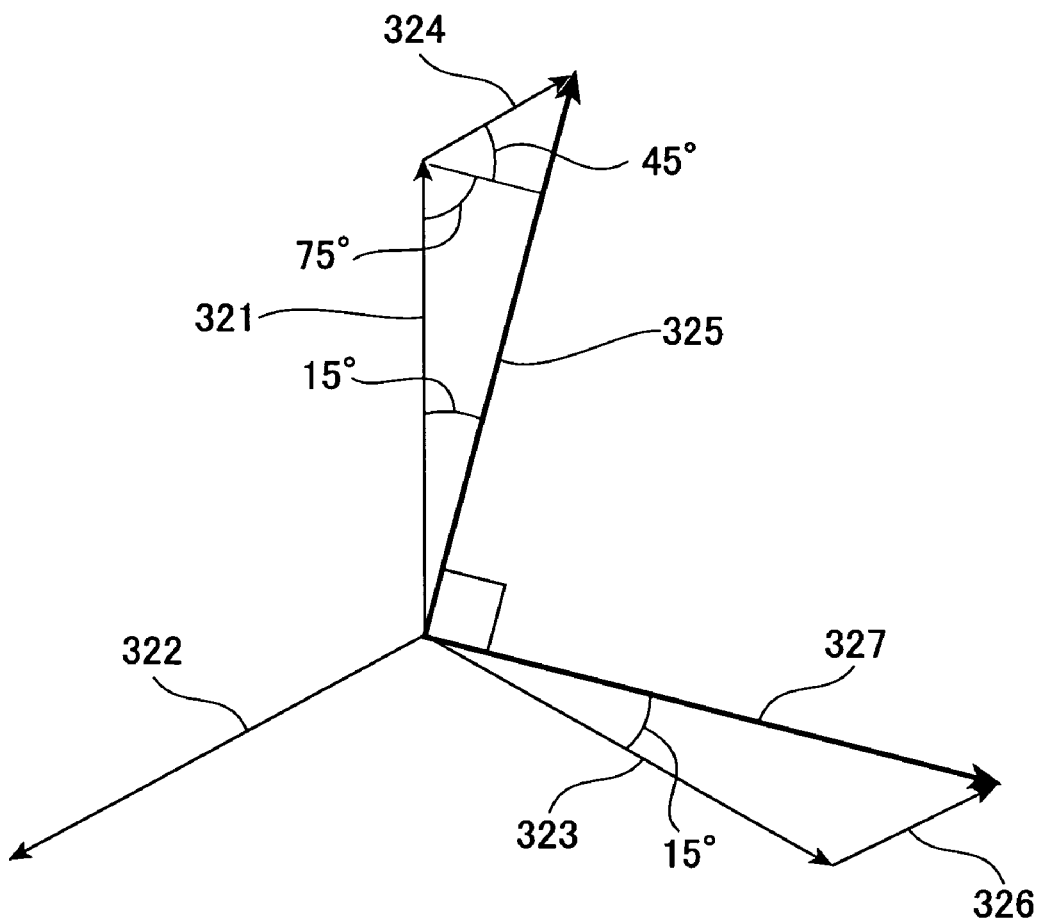
FIG. 22 is a diagram illustrating an example of a method of producing orthogonal current vectors of two phases from current vectors of three phases.

The two-phase motors described above can each be driven using an inverter capable of two-phase current drive, however, they suffer from a problem that eight transistors are required to be used. FIG. 22 is a diagram of current vectors, for explaining an example of a method of driving a two-phase motor with a three-phase inverter.

In the figure, indicated by 321, 322 and 323 are U-, V- and W-phase current vectors, respectively, of three phases. There are innumerable ways of plotting two-phase current vectors having a phase difference of 90° using these three-phase vectors. FIG. 22 shows an example of such a method. Indicated by 327 is an A-phase current vector which is a composite vector of the W-phase current vector 323 and a negative V-phase current vector 326. Indicated by 325 is a B-phase current vector which is a composite vector of the U-phase current vector 321 and a negative V-phase current vector 324.

The A- and B-phase current vectors have the same amplitude but have a phase difference of 90° therebetween. In preparing the windings of the phases A and B, two sets of wire members are parallelly wound up and combined. In this case, the number of turns proportionate to the magnitude of the current vectors shown in FIG. 22 is selected to plot approximate current vectors. Since only an integer can be selected for the number of turns, an error may be caused in the current vectors to some extent, but the current vectors may enable driving with a three-phase inverter. The error can be corrected to some extent by adjusting the phases and amplitudes of the three-phase currents. In the practical motor designing, the magnitude and phase of each of the current vectors are adjusted by the number of turns of the winding of the phase. Therefore, unless the specification of a motor is determined, a method of composing vectors, which matches the motor, cannot be flatly determined.

Figure 23:
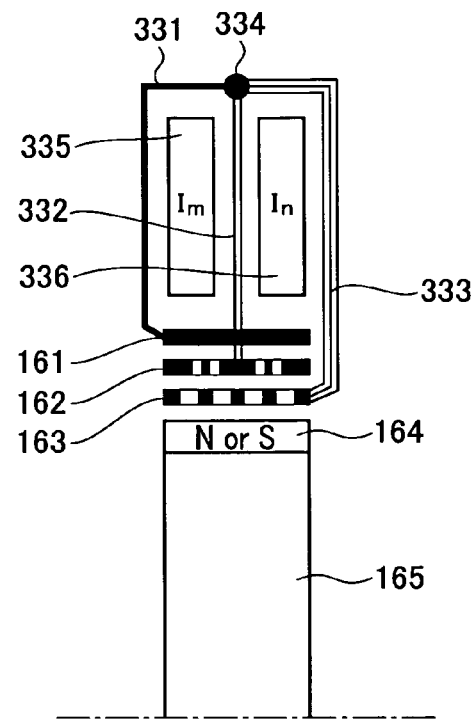
FIG. 23 is a diagram illustrating a three-phase AC motor configured by two loop windings and magnetic paths formed by bending an electromagnetic steel plate.

Referring now to FIG. 23, hereinafter is described a motor corresponding to the motor based on conventional art as shown in FIGS. 51 and 52. In the motor shown in FIG. 23, the magnetic paths are configured by processing an electromagnetic steel plate, using bending, molding, drawing, and the like.

The motor shown in FIG. 23 is a three-phase sixteen-pole motor. In the figure, indicated by 164 is an N- or S-pole permanent magnet segment of the rotor. Indicated by 165 is the rotor in which the lower side of the rotor as viewed in the figure is the center of rotation of the rotor. FIG. 5 illustrates a circumferential linear development of an example of an arrangement and configuration of the N-pole segments 151 and S-pole segments 152 of the rotor, with the abscissa indicating rotational angle in terms of electrical angle.

FIG. 23 is a schematic circumferential transparent cross section imaginarily illustrating the stator of the motor. In the figure, indicated by 161 is a U-phase stator pole, by 162 is a V-phase stator pole and by 163 is a W-phase stator pole. Since this figure shows a circumferential cross section of the stator, the shapes of these stator poles of the three phases should normally be drawn being overlapped with each other. However, for convenience, the stator poles 161, 162 and 163 are indicated being vertically separated as viewed in the figure. With the illustration of FIG. 23, the conceptual relationship between the stator poles and the individual magnetic paths of each phase can be visually indicated. Eight sets of the stator poles 161, 162 and 163 are arranged on the same circumference.

FIG. 4 is a circumferential linear development of the U-, V- and W-phase stator poles 141, 142 and 143 as an example of an arrangement and configuration. In the figure, the abscissa indicates rotational angle of the rotor in terms of electrical angle. The stator poles of the individual phases are arranged so as to face the permanent magnet assembly of the rotor. With this configuration, torque is generated by the electromagnetic attraction force and repulsive force when magnetomotive force is generated by the motor current.

Similar to the motor shown in FIG. 52, indicated by 335 in the motor shown in FIG. 23 is a loop winding which is a combination of the U- and V-phase windings and passes current expressed by −Iu+Iv. Indicated by 336 is a loop winding which is a combination of the V- and W-phase windings and passes current expressed by −Iv+Iw. Indicated by 331 is a U-phase magnetic path, by 332 is a V-phase magnetic path and by 333 is a W-phase magnetic path. Using the method of obtaining the motor shown in FIGS. 1 and 3, the parts of the magnetic paths are each formed by processing an electromagnetic steel plate using bending, molding, drawing, and the like, and are combined to configure the stator.

In the motor shown in FIG. 23, the windings have been simplified into the form of loop windings. The magnetic paths of the stator each have a complicated three-dimensional shape, however, can be readily obtained by variously processing an electromagnetic steel plate. As a result, as far as compact motors are concerned, high productivity and low cost can be realized.

Figure 24:
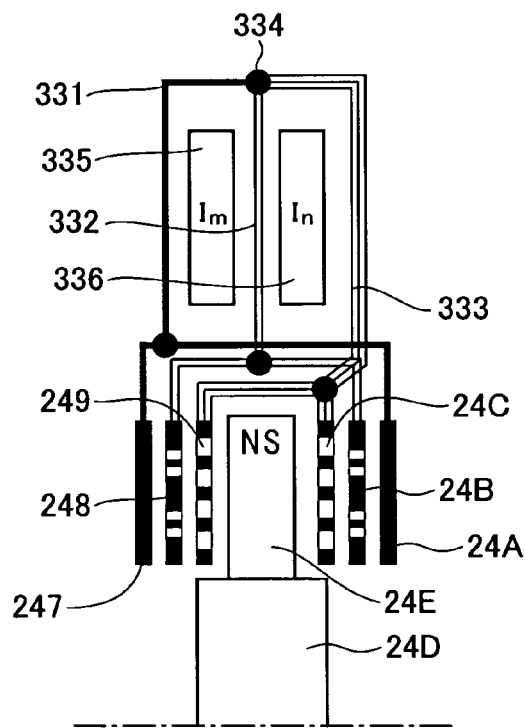
FIG. 24 is a diagram illustrating a three-phase AC motor that uses both of the front-side magnetic flux and the rear-side magnetic flux of a permanent magnet assembly and is configured by two loop windings and magnetic paths formed by bending an electromagnetic steel plate.

Referring to FIG. 24, hereinafter is described another example of a three-phase motor.

This motor is a three-phase sixteen-pole motor using the rotor 24D, permanent magnet segments 24E, U-phase stator poles 247 and 24A, V-phase stator poles 248 and 24B, and W-phase stator poles 249 and 24C shown in FIG. 14. Also, this motor uses the loop windings 335 and 336, U-, V- and W-phase magnetic paths 331, 332 and 333 shown in FIG. 23. In other words, the motor shown in FIG. 24 is obtained by combining a part of the motor shown in FIG. 14 and a part of the motor shown in FIG. 23. The motor shown in FIG. 24 has comparatively simply configured windings and magnetic paths and is able to generate large torque.

Hereinafter are described various examples of the specific shapes of an electromagnetic plate used for the motor of the present invention.

For the motor of the present invention, parts of the magnetic paths are fabricated by processing an electromagnetic steel plate using bending, molding, drawing, and the like. These parts are then assembled in combination with loop windings to configure the motor. The loop windings may each be formed into a waveform as required. In any case, the loop windings each have a comparatively simple shape. However, this motor raises an issue that the stator poles and the magnetic paths of the individual phases will each have a three-dimensional shape. Another issue in addition to the above is that, in order to avoid interference between the parts at the time of assembling, some constraints have to be imposed on the shape of each of the stator poles and the magnetic paths. There are other issues including: the necessity of sufficiently reducing magnetic resistance at the magnetic connecting portions between the parts made from the electromagnetic steel plate; the necessity of reducing eddy current loss by reducing the eddy current in the electromagnetic steel plate; the necessity of reducing the cyclic current passing along the circumference in the electromagnetic steel plate; and the necessity of effectively fabricating parts with good yields from a flat electromagnetic steel plate material.

Figure 25:
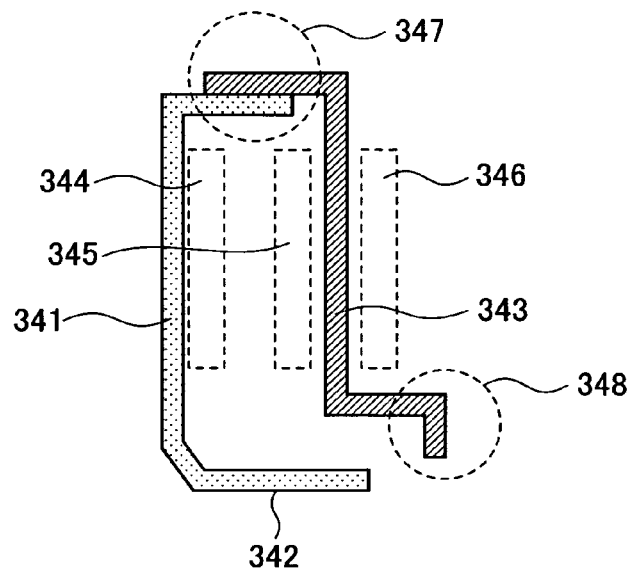
FIG. 25 is a diagram illustrating an example of a configuration in which two parts of an electromagnetic steel plate are magnetically connected.

FIG. 25 is a circumferential cross section illustrating a specific image of the electromagnetic steel plate defining the U-phase magnetic path 166 of the motor shown in FIG. 6. The electromagnetic steel plate, as seen from the direction of the rotor shaft, is a plate connected to two or more U-phase stator poles, as shown in FIG. 3. Thus, both configurations can be realized, i.e. the configuration in which the electromagnetic steel plate is separated into the circumferential direction, and the configuration in which the electromagnetic steel plate takes an annular form. FIG. 25 shows the shape of a single electromagnetic steel plate forming the magnetic paths and is suitable for a compact motor. With this shape, the magnitude of the magnetic flux of the magnetic poles of each phase will be comparatively small. In the figure, indicated by 342 is a U-phase stator pole facing the rotor. The U-phase magnetic flux directed from the lower side as viewed in the figure will pass the U-phase stator pole 342. Indicated by 344 is a space for arranging a U-phase winding, by 345 is a space for arranging a V-phase winding and by 346 is a space for arranging a W-phase winding. If the magnetic path 166 of FIG. 6 is formed of a single part of an electromagnetic steel plate, the windings 167 and 16A cannot be incorporated into the magnetic path.

To take measures against the above issue, the single part of an electromagnetic steel plate is divided into parts 341 and 343 shown in FIG. 25. These two parts 341 and 343 are arranged in parallel being in close contact with each other at a portion 347 indicated by the dashed circle to provide a configuration that allows passage of magnetic flux. A portion 348 indicated by the dashed circle in FIG. 25 is required to be magnetically connected to the W-phase magnetic path 168 shown in FIG. 6. Therefore, a bent portion indicated in the dashed-circle portion 348 is provided to increase the facing area between the parts 341 and 343 to thereby reduce the magnetic resistance that would be caused in the gap portion between these parts.

The parts 341 and 343 can each be made comparatively easily from an electromagnetic steel plate using a bending process, and the like. The fine shape such as of an arc formed along the circumference in the U-phase stator pole 342 can be realized with a molding process or the like using a die, prior to the bending process. The parts formed in this way are assembled to realize the function as a magnetic path for passing magnetic flux, whereby the entire motor can be fabricated. Similarly, other stator poles and magnetic paths can also be formed by dividing a single part as required.

Figure 26:
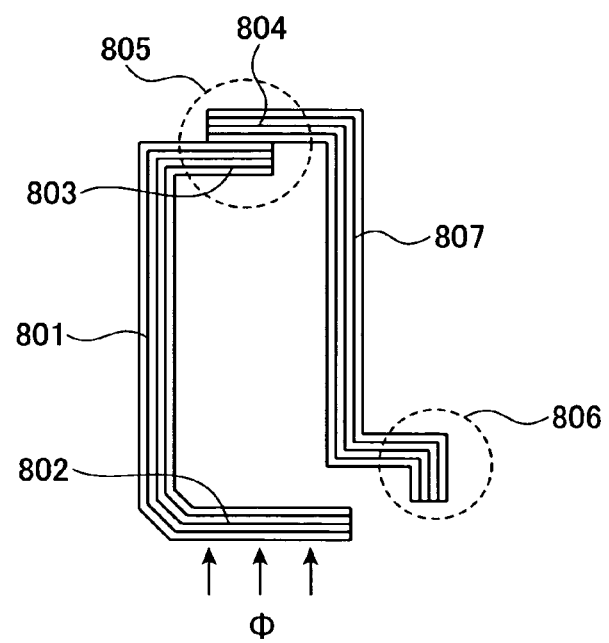
FIG. 26 is a diagram illustrating an example in which two magnetic paths configured by a plurality of stacked electromagnetic steel plates are magnetically connected.

Referring to FIG. 26, hereinafter is described an example of stacked electromagnetic plates. Specifically, in this example, a plurality of electromagnetic steel plates are stacked to configure the magnetic paths of each phase to thereby provide a motor which is slightly larger in size and has a larger amount of magnetic flux than the example of the motor shown in FIG. 25. In FIG. 26, each magnetic path shown in FIG. 25 is configured using four electromagnetic steel plates stacked one on the other.

Assuming that each of the electromagnetic steel plates has the same thickness in both of magnetic paths 801 and 807 shown in FIG. 26, these magnetic paths 801 and 807 can pass magnetic flux which is larger by a factor of four than the magnetic flux passed in the configuration shown in FIG. 25. However, in a U-phase stator pole 802, magnetic flux Φ, which is passed from the rotor located in the lower side as viewed in the figure, changes with the rotation of the rotor.

In this case, since the magnetic flux is passed from the plane of each electromagnetic steel plate and changes with the rotation of the rotor, eddy current is caused in the U-phase stator pole 802, generating heat because of the eddy current loss. This raises a problem in the motor efficiency. The same applies to a portion 805, indicated by the dashed circle, for connecting magnetic paths via portions 803 and 804. In a portion 806, as well, for connecting magnetic paths, eddy current is likely to be caused. Eddy current is similarly caused in the configuration of a single electromagnetic steel plate shown in FIG. 25.

Figure 27:
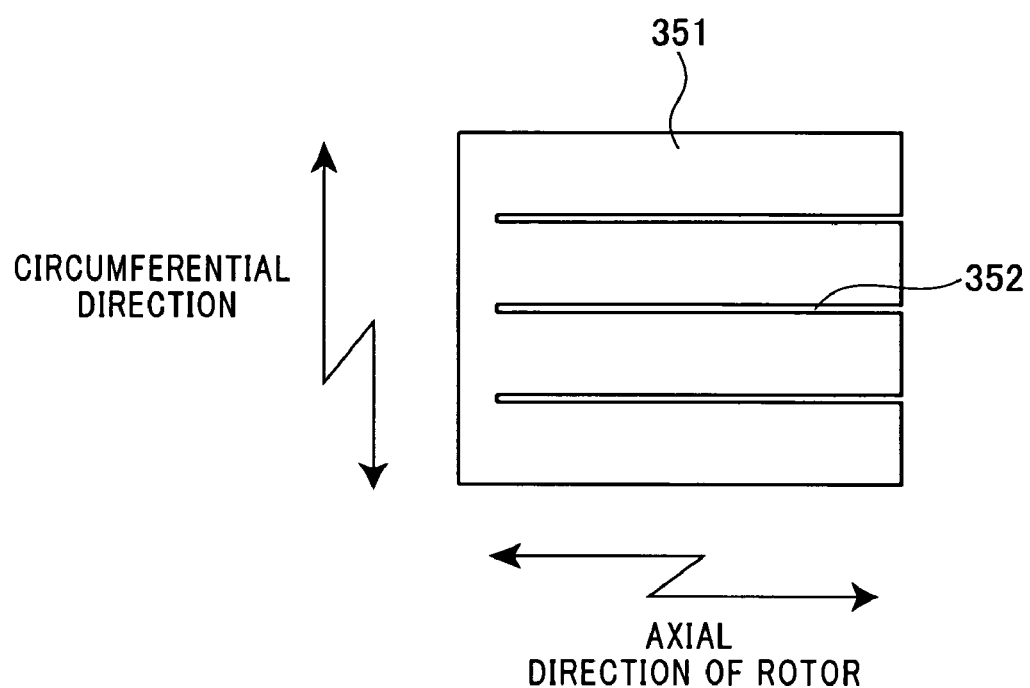
FIG. 27 is a diagram illustrating an electromagnetic steel plate with slits, as viewed from the permanent magnet assembly of the rotor.

To take measures against the problem of eddy current, fine slits, or grooves, may be formed in each electromagnetic steel plate as shown in FIG. 27, so that eddy current can be considerably reduced in its plane 351. The shape shown in FIG. 27 corresponds to the shape of the lower face, as viewed in the figure, of the U-phase stator pole shown in FIG. 26. In FIG. 26, the horizontal direction in the figure corresponds to the axial direction (the direction along the rotor shaft) and the vertical direction in the figure corresponds to the circumferential direction.

Figure 28:
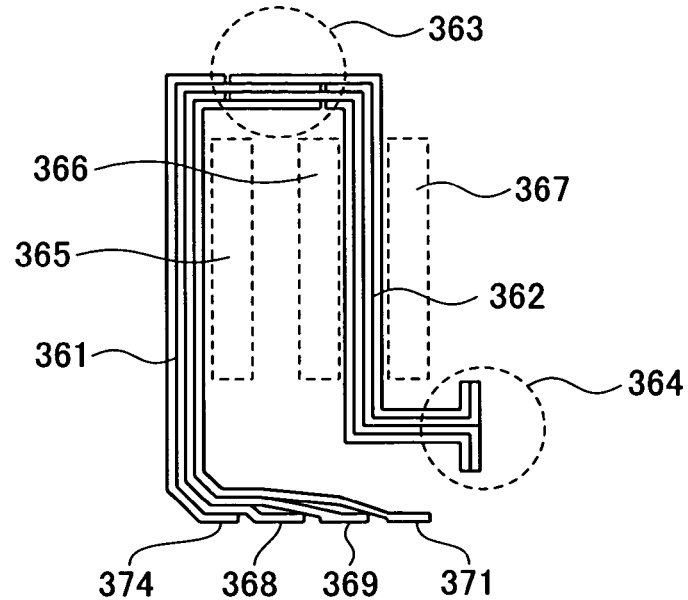
FIG. 28 is a diagram illustrating a circumferential structure of stator poles facing the permanent magnet assembly of the rotor and configured by a plurality of electromagnetic steel plates, and illustrating a method of connecting the magnetic paths configured by the plurality of electromagnetic steel plates.

Referring to FIG. 28, an example of another shape of electromagnetic steel plates will be described.

In the figure, indicated by 374, 368, 369 and 371 are portions of a U-phase stator pole. These portions correspond to the U-phase stator pole 802 shown in FIG. 26 and form a face opposed to the rotor. Thus, these portions in the face opposed to the rotor are separated from each other in the axial direction. The surface configuration of the U-phase stator pole as viewed from the side of the rotor is shown in FIG. 29, designating the same reference numerals 374, 368, 369 and 371.

Indicated by 377 is a gap between the portions 369 and 371. The gap 377 may preferably be narrowed to the extent not causing electrical contact. With the structure in which a plurality of electromagnetic steel plates are used to form the stator poles, the magnetic flux from the side of the rotor can be independently passed through each of the electromagnetic steel plates, thereby providing a configuration causing only small eddy current.

In the configuration shown in FIG. 26, each gap between the parts each formed of the four electromagnetic steel plates is required to be made small as much as possible, because the gap may problematically cause magnetic resistance. In this regard, with the configuration shown in FIG. 28, the magnetic flux from the side of the rotor is directly passed to each of the portions 374, 368, 369 and 371 of the U-phase stator pole. For this reason, a very small gap, if such is present between these portions of the electromagnetic steel plates, is unlikely to raise any problems associated with magnetic actions.

Figure 29:
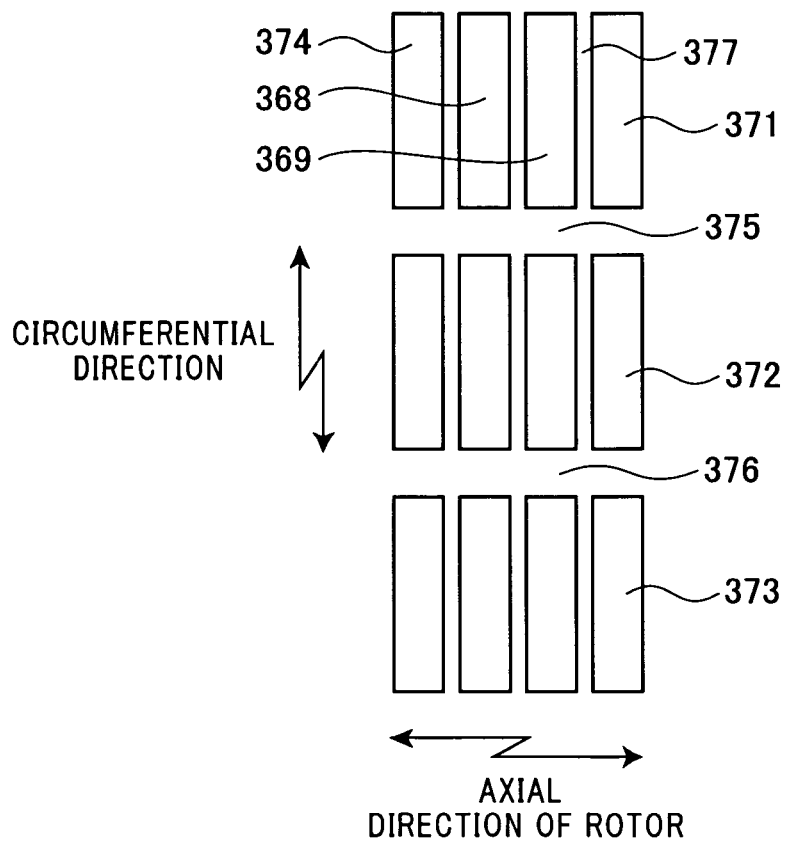
FIG. 29 is a diagram illustrating the shapes of the stator poles illustrated in FIG. 28, as viewed from the side of the rotor.

In FIG. 29, indicated by 372 is a V-phase stator pole and by 373 is a W-phase stator pole. The same matters as in the U-phase stator pole apply to these V- and W-phase stator poles 372 and 373. The U-, V- and W-phase stator poles are arranged being mutually separated in the circumferential direction by an electrical angle of 120°. Each of spaces 375 and 376 between the stator poles has a size that would not raise a problem of magnetic flux leakage from between the stator poles.

Figure 31:
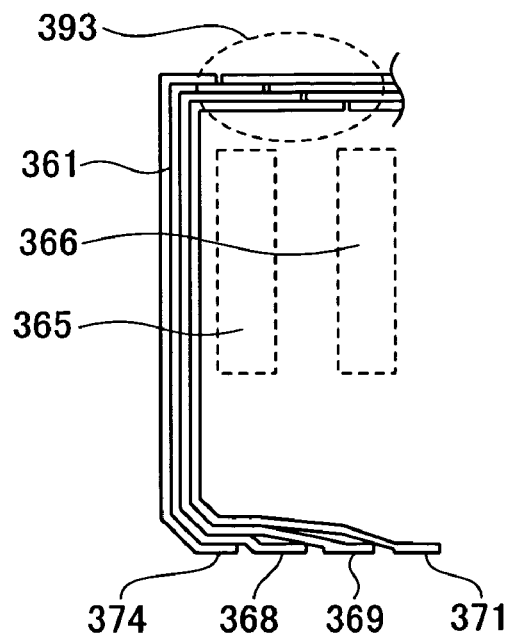
FIG. 31 is a diagram illustrating an example in which two magnetic paths configured by a plurality of stacked electromagnetic steel plates are magnetically connected.

In FIG. 28, a connecting portion 363 of the electromagnetic plates, which is indicated by the dashed circle has a configuration improved from that of the portion 805 indicated by the dashed circle in FIG. 26. In the connecting portion 363, the electromagnetic steel plates are alternately arranged. Accordingly, the facing area between the left- and right-side electromagnetic steel plates is increased to reduce the magnetic resistance in the gaps between the parts each formed of the electromagnetic steel plates. FIG. 28 shows an example in which the electromagnetic steel plates abut against one another in two portions. However, the number of abutting portions may be three or four, which may be favorable, from the view point of reducing magnetic saturation. For example, the abutting portions may be provided in a staircase pattern as shown by 393 in FIG. 31.

A portion 364 indicated by the dashed circle in FIG. 28, which corresponds to the magnetic flux conversion point MN shown in FIG. 6 and also to the connecting point 806 shown in FIG. 26, is configured being bent to both sides. Alternatively, the portion 364 may be configured in a similar manner to the portions 374, 368, 369 and 371.

Figure 30:
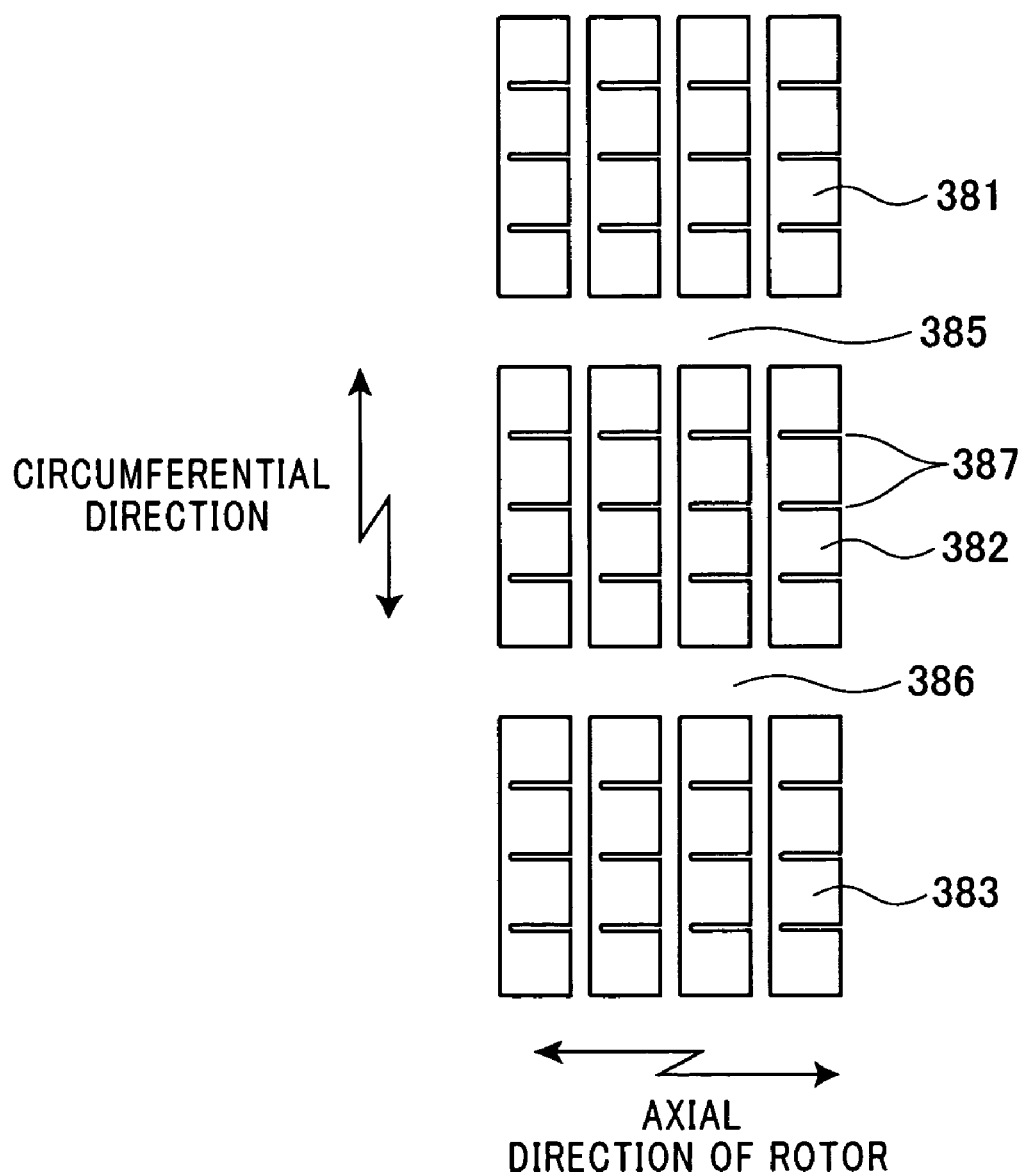
FIG. 30 is a diagram illustrating the stator poles illustrated in FIG. 29 with an addition of slits.

Referring to FIG. 30, hereinafter is explained a method for further reducing the eddy current in the stator poles shown in FIG. 29. In FIG. 30, indicated by 381 is a U-phase stator pole, by 382 is a V-phase stator pole and by 383 is a W-phase stator pole. As can be seen, these stator poles are provided with slits as indicated by reference numeral 387 to reduce the total area, which faces the rotor, of the stator poles as a whole. This configuration is effective in reducing the eddy current. Indicated by 385 and 386 are gaps between the stator poles of different phases.

Figure 32:
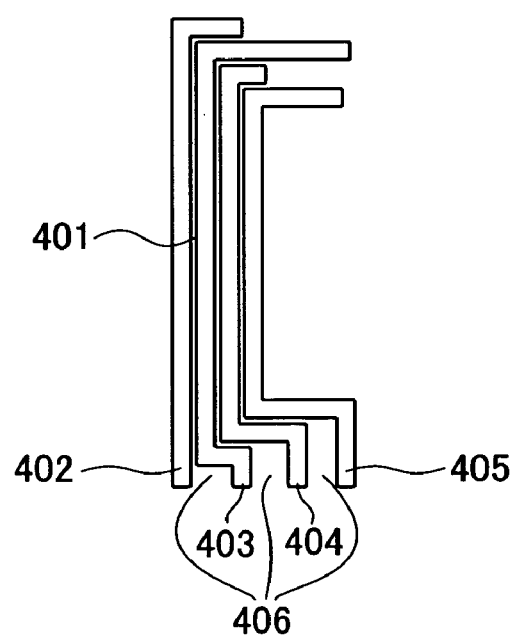
FIG. 32 is a diagram illustrating an example of the shapes of stator poles configured by a plurality of electromagnetic steel plates.

FIG. 32 shows another example of the shapes of the stator poles. In the figure, indicated by 401 is a U-phase magnetic path and by 402, 403, 404 and 405 are U-phase stator poles facing the rotor. The end faces of the electromagnetic steel plates in this configuration are oriented to the rotor so that the total area, which faces the rotor, of the stator poles as a whole can be slightly reduced. However, since magnetic flux will turn around and enter into the stator from gaps 406 between the stator poles, this configuration cannot so much enhance the magnetic resistance as can be expected from the degree of reduction in the area facing the rotor. Or rather, it can be expected that these stator poles, which have simple shapes and can be fabricated easily, will have an effect of reducing eddy current, when compared the to the portions 374, 368, 369 and 371 of FIG. 28. The shapes of the stator poles shown in FIG. 32 are favorable in the case where an Nd—Fe—B based rare-earth magnet is used for the magnetic poles of the rotor, because these shapes will raise the magnetic flux density and enhance the magnetomotive force of the magnet.

Figure 33:
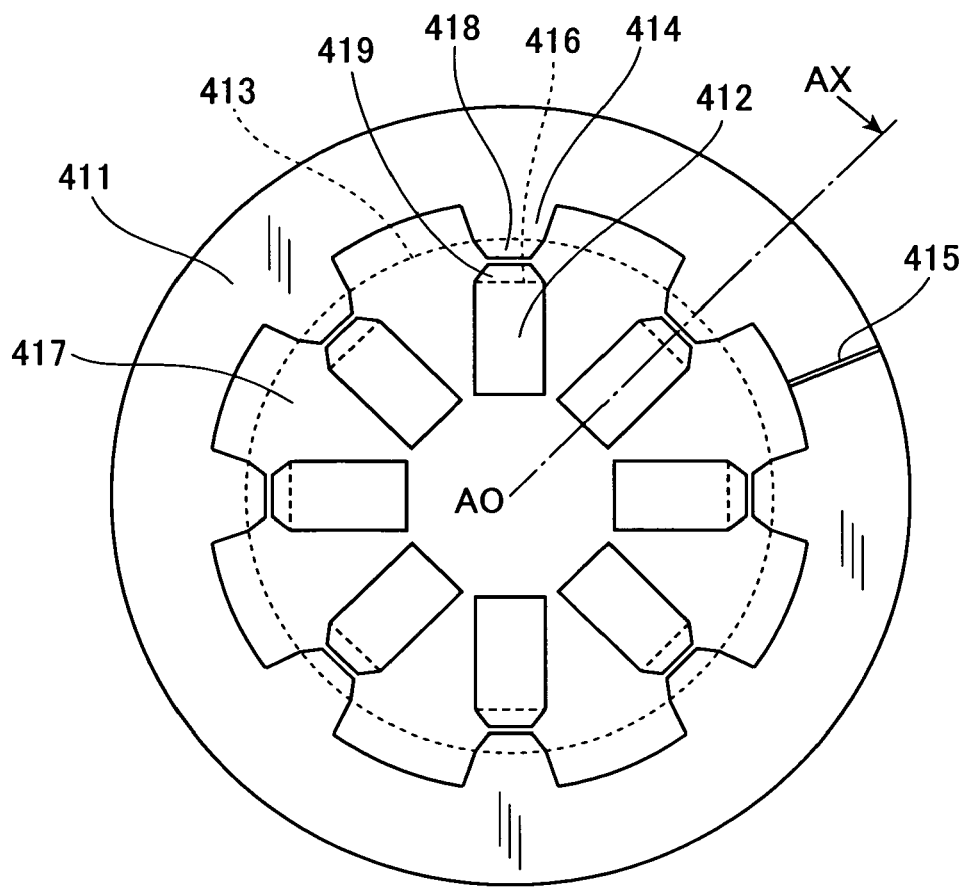
FIG. 33 is a diagram illustrating the configuration of a V-phase electromagnetic steel plate of a three-phase sixteen-pole AC motor.

Referring to FIG. 33, hereinafter is described a specific example for fabricating the stator poles and magnetic paths of the phase V of a motor, from a flat electromagnetic steel plate material.

Figure 34:
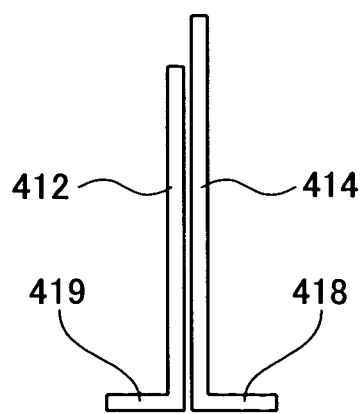
FIG. 34 is a circumferential cross section illustrating a V-phase magnetic path in the illustration of FIG. 33.

With the example shown in FIG. 33, such components can be fabricated from a flat material, as the V-phase stator pole 162 and the magnetic path 16B of FIG. 6, as well as the V-phase stator pole 162 and the magnetic path 332 of FIG. 23. In FIG. 33, indicated by 413 is an inner circumference of the stator, by 414 is a magnetic path connecting between the V-phase back yoke and a tip end of each V-phase stator pole. Indicated by 418 is one half of a V-phase stator pole which is bent by an angle 90° in the vicinity of the circumference 413. Indicated by 412 is a V-phase magnetic path which is fabricated using the inner-diameter side of the flat electromagnetic steel plate material. Indicated by 419 is the other half of the V-phase stator pole which is bent by an angle 90° at a dashed line 416. FIG. 34 is a circumferential cross section taken along a line AX-AO of FIG. 33 to show these components. The lower side, as viewed in the figure, of the two halves 419 and 418 constitutes a V-phase stator pole facing the rotor. Indicated by 411 is a V-phase back yoke, the detailed description of which will be omitted here.

In the example shown in FIG. 33, the inner side of the flat electromagnetic steel plate material is also utilized to provide the V-phase part 412, whereby the utilization of the flat electromagnetic steel plate material is enhanced. The flat electromagnetic steel plate material can be utilized variously. For example, the vicinity of a portion 417 of FIG. 33 may also be bent toward the side of the back yoke for utilization as a magnetic path. In FIG. 33, indicated by 415 is a slit for cutting the cyclic current which would otherwise flow through the annular electromagnetic steel plate.

In the case of the motor shown in FIGS. 33 and 34, the shape of the V-phase stator pole is completed by combining the two halves 418 and 419. In order to reduce torque ripple, the shape of each of the U- and W-phase stator poles, as viewed from the side of the rotor, should be the same as that of the V-phase stator pole.

Figure 35:
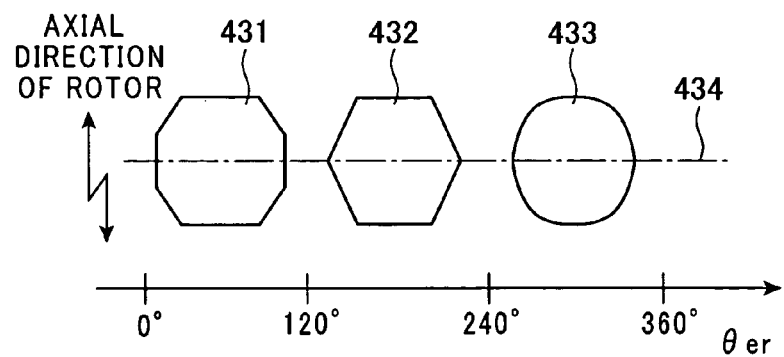
FIG. 35 is a diagram illustrating an example the shapes of the stator poles, as viewed from the side of the rotor.

FIG. 35 shows some examples of the shape of a stator pole as viewed from the side of the rotor. The abscissa indicates rotational angle θer of the rotor in terms of electrical angle and the vertical direction corresponds to the axial direction. From the view point of generating average torque, more advantages may be obtained as an amount Φ of the magnetic flux passing through the stator poles becomes larger. Also, from the viewpoint of reducing radial vibration and torque ripple, it is desirable that the magnetic flux distribution changes smoothly.

A pole shape 431, which is rectangular with its corners being cut off, is able to reduce harmonic components while keeping the reduction in the amount of magnetic flux comparatively small. A pole shape 432 is trapezoidal and a pole shape 433 is made smoother. The smoother shape, which will allow the radial attraction force acting on the stator to change smoothly, is a desirable shape from the viewpoint of reducing the radial vibration and torque ripple. Indicated by 434 is a center of the stator pole. The axially symmetrical configuration of the stator pole will cancel the axial attraction force and reduce the axial vibration. Instead of variously changing the shape of a stator pole as viewed from the side of the rotor, however, the radial shape of a stator pole and/or a rotor pole may be changed. Alternatively, both of the axial and radial changes in the shape may be used.

Figure 36:
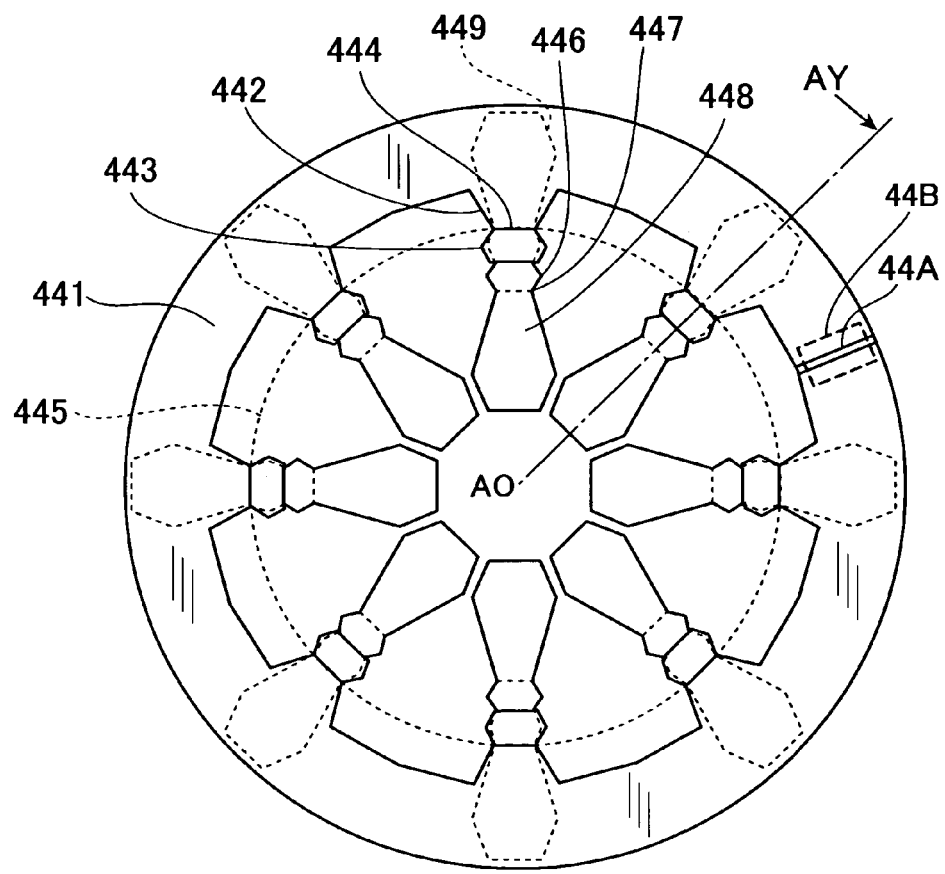
FIG. 36 is a diagram illustrating the configuration of the U-phase or W-phase electromagnetic steel plate of a three-phase sixteen pole AC motor.

FIG. 36 shows an example of fabricating the stator poles and magnetic paths of the phase U or W of a motor, from a flat electromagnetic steel plate material. With the example shown in FIG. 36, such components can be fabricated from a flat electromagnetic steel plate material, as the U-phase stator pole 161 and magnetic path 166 of the motor shown in FIG. 6, or the W-phase stator pole 163 and magnetic path 168 of the motor shown in FIG. 6, or the U-phase stator pole 161 and magnetic path 331 of FIG. 23, or the W-phase stator pole 163 and magnetic path 333 of FIG. 23.

Figure 37:
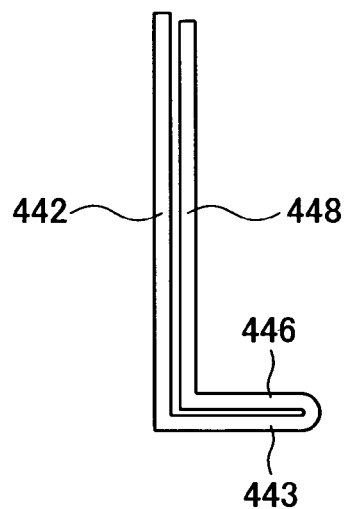
FIG. 37 is a circumferential cross section illustrating an example of a U-phase or W-phase stator pole.

In FIG. 36, indicated by 445 is an inner circumference of the stator, by 442 is a magnetic path connecting between the back yoke and a tip end of a stator pole. Indicated by 443 is a stator pole which will be bent later by an angle 90° in the vicinity of the circumference 445. Indicated by 448 is a magnetic path which is made utilizing the inner-diameter side of the flat electromagnetic steel plate material. Indicated by 446 is a stator pole which is bent by an angle 90° at a portion 447. FIG. 37 is a cross section taken along a line AY-AO of FIG. 36 to show a specific bent shape of a component. By turning back the electromagnetic steel plate, a stator pole and a magnetic path toward the back yoke are configured by two folds of the electromagnetic steel plate. Further, formation of slits or the like in the stator pole can reduce eddy current. Since the shape of a back yoke 441 depends on motors, details are not shown.

In FIG. 36, indicated by 44A is a slit for cutting the cyclic current which would otherwise flow through the annular electromagnetic steel plate. The addition of this slit will deteriorate the strength of the electromagnetic steel plate. Therefore, a plate 44B for ensuring electrical insulation may be fixed to the slit portion such as by adhesion for reinforcement.

In the case where a plurality of electromagnetic steel plates are stacked to form a magnetic path, slits may be formed at circumferentially different positions, followed by mutually fixing the electromagnetic steel plates for reinforcement. Although the slit 44A shown in FIG. 36 is linearly formed, slits may each have a wedge shape and may be formed from alternately opposite direction at circumferentially different positions, for example, so that the electromagnetic steel plates can be mutually mechanically strengthened, while the electrical conduction can be reliably insulated.

Figure 38A:
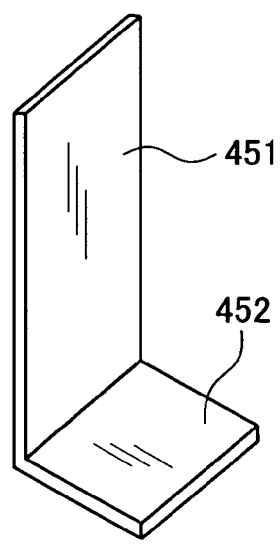
FIGS. 38A and 38B are diagrams each illustrating a method of increasing the cross-sectional area of a magnetic path which is formed by bending an electromagnetic steel plate.
Figure 38B:
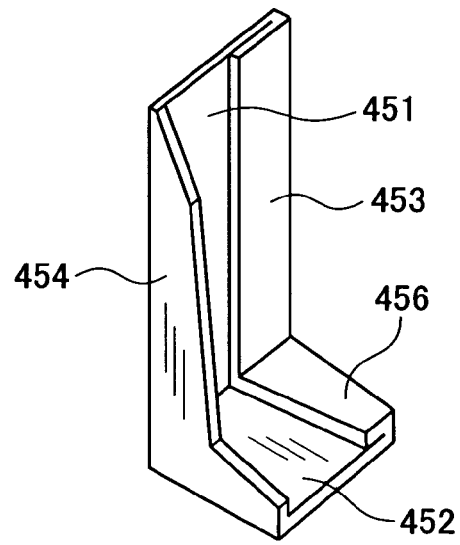

In a motor having magnetic paths which are formed by bending an electromagnetic steel plate, simplification in the configuration of the magnetic paths may not necessarily achieve the enlargement of the cross-sectional area of each of the magnetic paths. Therefore, it is effective to use a technique of enlarging the cross-sectional area of each magnetic path to pass magnetic flux. For example, portions 451 and 452 of the electromagnetic steel plate shown in FIG. 38A are orthogonal to each other after being bent. With this shape, magnetic flux passes from the portion 451 to the portion 452. In this case, the electromagnetic steel plate may have a shape as shown in FIG. 38B in order to increase the cross-sectional area of the magnetic path. Specifically, in FIG. 38B, such portions as indicated by 454, 453 and 456 are added to increase the cross-sectional area of the magnetic path.

Figure 39:
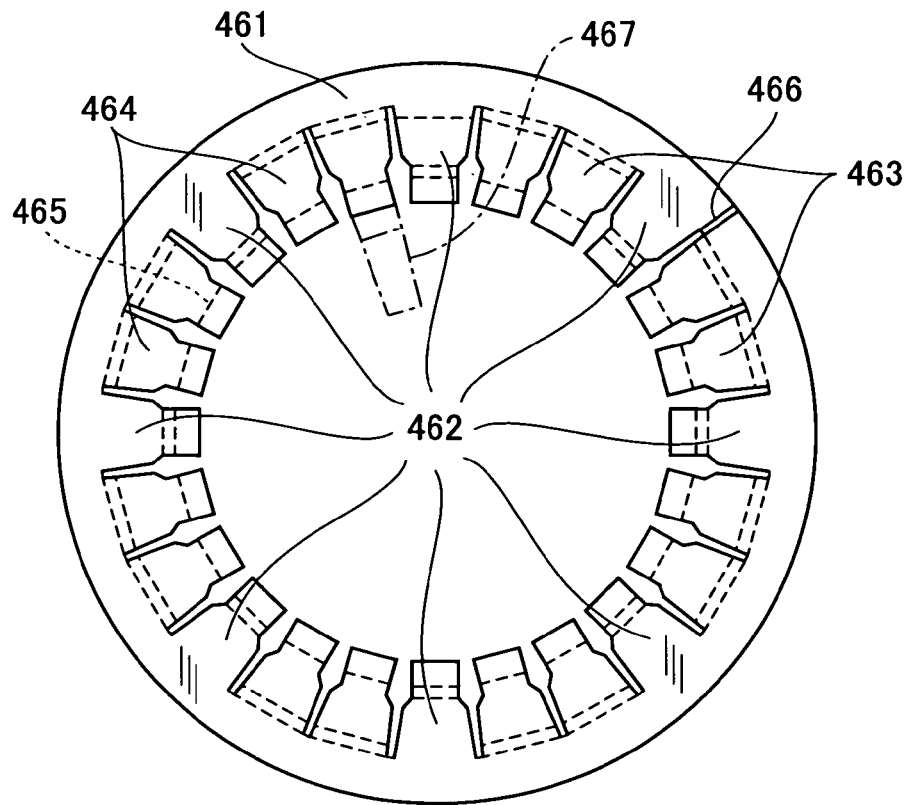
FIG. 39 is a diagram illustrating an example of a configuration under the process of forming three-phase stator poles and three-phase magnetic paths from a single electromagnetic steel plate.
Figure 40:
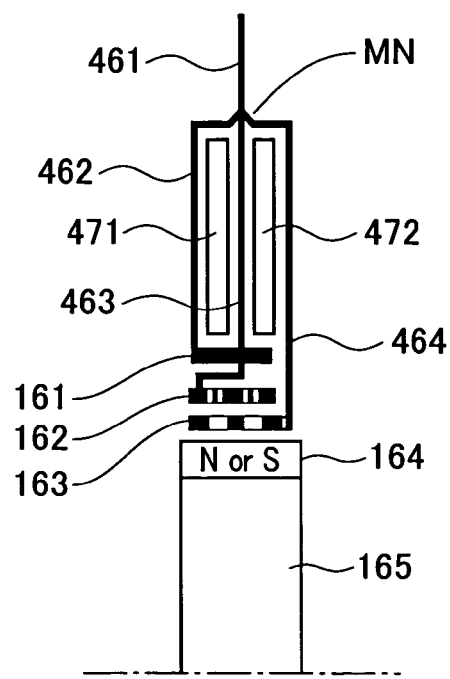
FIG. 40 is a diagram illustrating a circumferential cross section illustrating the stator magnetic paths formed by the electromagnetic steel plate illustrated in FIG. 39.

Referring to FIGS. 39 and 40, hereinafter is described an example of a motor in which three-phase magnetic paths of the stator are formed from a single electromagnetic steel plate.

The shape shown in FIG. 39 is drawn from a single flat electromagnetic steel plate first. Then, portions indicated by the dashed lines in FIG. 39 are bent by 90° to provide a three-dimensional shape as shown in FIG. 40. FIG. 40 is a schematic circumferential transparent cross section imaginarily illustrating the motor. In the figure, indicated by 164 is a permanent magnet segment of the rotor, by 165 is the rotor in which the lower side of the rotor as viewed in the figure is the center of rotation of the rotor. Indicated by 161 is a U-phase stator pole, by 162 is a V-phase stator pole and by 163 is a W-phase stator pole. Since this figure shows a circumferential cross section of the stator, the shapes of these stator poles of the three phases should normally be drawn being overlapped with each other. However, for convenience, the stator poles 161, 162 and 163 are indicated being vertically separated as viewed in the figure. With the illustration of FIG. 40, the conceptual relationship between the stator poles and the individual magnetic paths of each phase can be visually indicated.

Further, indicated by 462 is a U-phase magnetic path, by 463 is a V-phase magnetic path and by 464 is a W-phase magnetic path. Indicated by 461 is a back yoke portion of the stator. The outer diameter of the motor may be reduced by bending the outer-diameter side of the back yoke portion in the shape shown in FIG. 40. Indicated by MN is a magnetic flux conversion point where the magnetic paths of the three phases are converted. FIG. 40 shows an example of forming a magnetic circuit configuration of the motor shown in FIG. 23 from a single electromagnetic steel plate. Similarly, the magnetic circuit configuration of the motor shown in FIG. 6 can also be formed from a single electromagnetic steel plate.

In FIG. 40, indicated by 471 is a loop winding that passes current expressed by Im=−Iu+Iv and by 472 is a loop winding that passes current expressed by In=−Iv+Iw. The loop windings 471 and 472 are required to be incorporated with due care so that interference between parts would not be caused by the incorporation. To this end, it may be required that the folds of the bent electromagnetic steel plate are temporarily widened, for example, for the insertion of the loop windings, and then, after completing the insertion, the magnetic paths and stator poles are formed into the final shapes. As the rotor 165 having the magnet segment 164, various types of rotors, such as a surface magnet rotor and an integrated magnet rotor may be used.

The stator having the magnetic path configuration and the loop windings shown in FIGS. 39 and 40 can be configured with three main components, and thus has a very simple structure and can be produced at low cost. The magnetic paths 461, 462, 463 and 464 are integrally configured. However, considering the easiness of fabrication associated such as with the incorporation of the loop windings, or the improvement of yields of the materials, the magnetic paths may be formed by dividing the stator into two or three segments. In this case, the magnetic paths may partly be overlapped with each other when the segments are combined, but may be regarded as being configured with a substantially single electromagnetic steel plate.

The magnetic path configuration and the loop windings shown in FIGS. 39 and 40 are based on an inner-rotor configuration, but they may be applied to an outer-rotor configuration. In this case, turns of the loop windings can be directly imparted to the stator poles from outside the stator poles. This may facilitate the provision of the loop windings and thus is very advantageous from the viewpoint of the manufacturing cost. The motors shown such as in FIGS. 6 and 23, when having the outer-rotor configuration, can also exert the characteristics of facilitating the turning of the loop windings, the characteristics being common to the motor shown in FIGS. 39 and 40.

Further, a portion 467 indicated by the dash-dot line in FIG. 39 may be folded back to have the folds overlapped with each other, so that the cross-sectional area of the magnetic path that passes the magnetic flux of this phase can be enlarged by a factor of two and that the output capacity of the motor can be increased. For the sake of simplicity, only a portion of the folded-back portion is shown in FIG. 39 as the portion 467 indicated by the dot-dash line, but it should be appreciated that other teeth are also provided with the similar configuration. The configuration of the magnetic paths shown in FIGS. 39 and 40 may also be obtained by stacking several electromagnetic steel plates having an analogous shape, so that the cross-sectional area of each magnetic path that passes the magnetic flux can be enlarged and that the output capacity of the motor can be increased.

Figure 41:
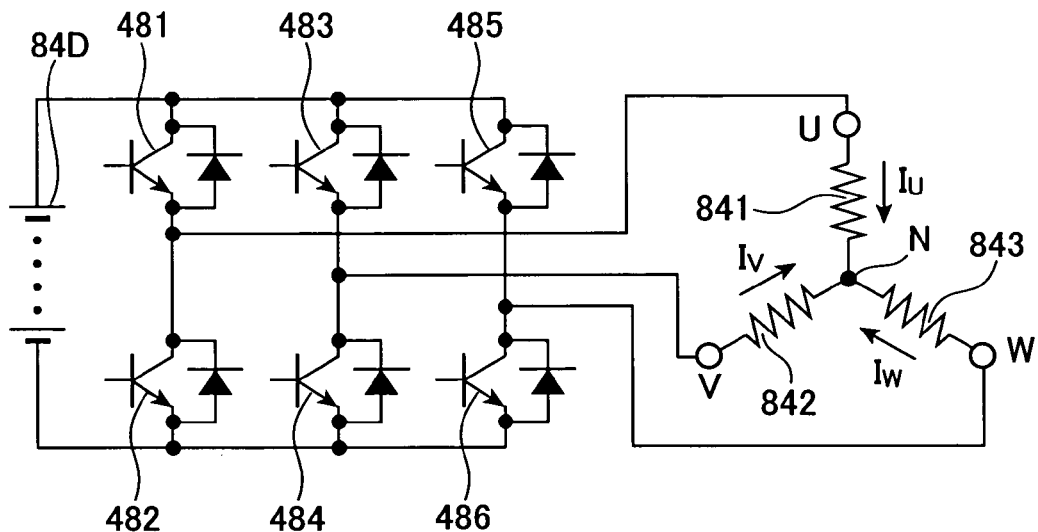
FIG. 41 is a diagram illustrating the configuration of a three-phase inverter and connection thereof with three-phase windings.

FIG. 41 shows a drive circuit that drives a three-phase motor.

Figure 42:
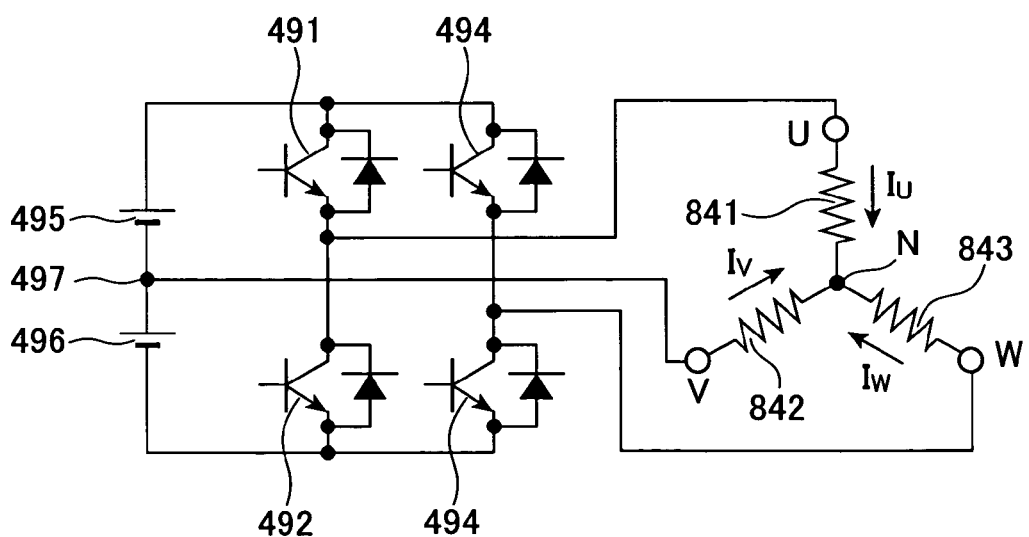
FIG. 42 is a diagram illustrating a driving system that supplies voltage and current to three-phase windings with four transistors.

In the figure, indicated by 841 is a U-phase winding, by 842 is a V-phase winding, by 843 is a W-phase winding and by N is a neutral point of the three-phase star connection of these windings. Indicated by 84D are DC voltage sources, such as batteries of an automobile. Indicated by 841, 842, 843, 844, 845 and 846 are transistors. These transistors are subjected to ON/OFF control to apply DC voltage to the windings and to control current, whereby the motor is driven. Such a motor driving system, if used in an application requiring high reduction of the cost, will raise a problem of the cost for the transistors and the peripheral parts of the transistors. In order to take measures against this problem, a compact and inexpensive motor that can be driven with four transistors, as shown in FIG. 42, may be provided. In this motor, the DC voltage sources have been replaced by two power sources 495 and 496 connected in series. Further, a neutral point 497 of the power sources is used as one terminal of the three-phase motor, while the voltage and current of other two terminals are controlled by the four transistors.

Since the freedom of the current in a three-phase motor that satisfies Formula (5) corresponds to two degrees of freedom, the motor can be controlled by four transistors. Since the potential of one terminal of the three-phase motor is fixed, utilization of the voltage may be reduced compared to the drive circuit shown in FIG. 41. However, this three-phase motor enables control with a less number of transistors and thus can be used in many applications that require reduction of the cost.

Further, of the two power sources 495 and 496, one may be configured as a DC-DC converter with the use of a transistor and a choke coil. Although this may increase the number of parts and thus the cost will be increased, if the power sources are used in common between a plurality of motors, the cost can be reduced in total.

The present invention described so far can be outlined as follows.

The loop windings of the motor of the present invention each have a simple configuration so that the manufacture can be facilitated and that the amount of the windings can be lessened to reduce the cost. In addition, such loop windings have small Joule loss and can enhance the efficiency. In particular, such loop windings are suitable for the motors with a flat structure. The motor using such loop windings, when provided with a multi-pole configuration, will not reduce the total cross-sectional area of the phase windings, whereby high torque can be attained.

The three-wire motor configuration, as a mode of a configuration using the loop windings, will build up good impedance balance and facilitate driving with an inverter having a simple structure.

Regarding the magnetic circuit for passing magnetic flux of the stator, three-dimensional magnetic paths can be formed by processing an electromagnetic steel plate, using punching, molding and bending. Such three-dimensional magnetic paths are particularly favorable for compact motors because of the easiness of manufacture. In this case, one of the important points of increasing peak torque of such a compact motor is to collect the magnetic fluxes to have them intersected, so that the spatial distance between adjacent magnetic paths can be increased and that flux leakage can be reduced.

Further, torque can be enhanced by using both of the front- and rear-side magnetic flux of the permanent magnet assembly. This is favorable for reducing the size and cost of the motor.

In the magnetic circuit of the stator, each magnetic path will have a large cross-sectional area by allowing the folds of the bent electromagnetic steel plate to overlap with each other. Accordingly, much more magnetic flux may be permitted to act on the motor to thereby increase the output capacitance of the motor. Also, efficient use of a flat electromagnetic steel plate may be variously contrived so that the yields of the electromagnetic steel plate can be improved. Further, using four transistors, a motor driving system can be provided at low cost.

In the motor of the present invention, from the viewpoint of motor efficiency, it is required to reduce eddy current in the parts constituting the magnetic circuit of the stator and thus to remove cyclic current that passes through the magnetic circuit. Also, in order to increase the peak torque of the motor, it is required to reduce magnetic flux leakage from the parts.

Various modes of the present invention have so far been described. However, the present invention is not intended to be limited to the modes described above, but may be modified in various manners. Such various modifications however are also intended to be encompassed by the present invention. For example, there is no limitation in the number of the poles of the motor. Also, the present invention can be applied to various types of rotors, although the description above has been focused on a surface magnet rotor. In addition, the loop windings may be modified into waveform loop windings, or the like.

Various techniques for reducing torque ripple may be applied to the motor of the present invention. Such techniques may include a technique for smoothing the shapes of the stator poles and rotor poles in the circumferential direction, a technique for smoothing these shapes in the radial direction, and a technique for partially shifting the rotor poles in the circumferential direction for cancellation of the torque ripple components.

The mode of the motor may also be variously modified. To express the modifications in terms of the shape of the air gap between the stator and the rotor, the motor may, for example, be an inner-rotor motor or an outer-rotor motor with a cylindrical air gap, or, alternatively, may be an axial-gap motor with a disk-like air gap. Alternatively, the motor may be modified into a linear motor. Alternatively, the cylindrical shape of the air gap of the motor may be slightly tapered.

Further, a plurality of motors including the motor of the present invention may be combined. Also, a part of the motor of the present invention may be omitted.

Besides the commonly used silicon steel plates, other soft magnetic materials may be used, including amorphous electromagnetic steel plates, and powder magnetic cores each obtained by applying insulation coating to iron powder, followed by press molding.

The motor of the present invention described above has been controlled, being supplied with sinusoidal current as current to be passed through the motor. However, current of various waveforms may also be used for the control of the motor.

Such variously modified motors, as far as these motors are the modifications in the spirit of the present invention, are also intended to be encompassed by the present invention.

What is claimed is:

1. An AC motor comprising:
a stator including a U-phase stator pole, a V-phase stator pole, and a W-phase stator pole;
a first loop winding interlinked with a first magnetic flux that passes through the U-phase stator pole;
a second loop winding interlinked with a second magnetic flux that passes through the V-phase stator pole; and
a third loop winding interlinked with a third magnetic flux that passes through the W-phase stator pole, wherein
the first, second and third loop windings of the three U-, V- and W-phases are arranged so as to be substantially parallel to each other; and
the three U-, V- and W- phases in which the first, second and third magnetic fluxes interlink with the first, second and third windings include a phase in which the magnetic flux is differently directed, the winding for the phase with differently directed magnetic flux having a winding start and a winding end which are reversed from those in other phases with unidirectionally directed magnetic fluxes.

2. The AC motor according to claim 1, wherein
the stator is provided with a magnetic circuit mostly formed of electromagnetic steel plates.

3. The AC motor according to claim 1, wherein:
the loop windings Lu, Lv and Lw of the three phases are arranged so as to be substantially parallel to each other; and
the magnetic fluxes Φu, Φv and Φw that interlink with the loop windings Lu, Lv and Lw are unidirectionally directed.

4. The AC motor according claim 1, further comprising:
a rotor configured to use magnetic flux Φk of a front face of a permanent magnet assembly and magnetic flux Φp of a rear face thereof;
a U-phase stator pole Suk located opposed to the front face of the permanent magnet assembly;
a U-phase stator pole Sup located opposed to the rear face of the permanent magnet assembly;
a magnetic path Ju that allows passage of magnetic flux Φuk passing through the U-phase stator pole Suk, in combination with magnetic flux Φup passing through the U-phase stator pole Sup;
a V-phase stator pole Svk located opposed to the front face of the permanent magnet assembly;
a V-phase stator pole Svp located opposed to the rear face of the permanent magnet assembly;
a magnetic path Jv that allows passage of magnetic flux Φvk passing through the V-phase stator pole Svk, in combination with magnetic flux Φvp passing through the V-phase stator pole Svp;
a W-phase stator pole Swk located opposed to the front face of the permanent magnet assembly;
a W-phase stator pole Swp located opposed to the rear face of the permanent magnet assembly; and
a magnetic path Jw that allows passage of magnetic flux Φwk passing through the W-phase stator pole Swk, in combination with magnetic flux Swp passing through the W-phase stator pole Swp.

5. The AC motor according to claim 1, wherein
a portion of each of the stator poles is configured to be electrically separated in two directions by forming slits, or the like, and
the portion being located opposed to a rotor.

6. The AC motor according to claim 1, wherein:
the stator pole of each of the phases is formed of two or more electromagnetic steel plates; and
the electromagnetic steel plates in a portion of each of the stator poles are electrically separated from each other, the portion being located opposed to a rotor.

7. The AC motor according to claim 6, wherein
the electromagnetic steel plates in a portion of each of the stator poles are configured to be electrically separated in two directions by forming slits, or the like, and
the portion being located opposed to a rotor.

8. The AC motor according to claim 6, wherein the electromagnetic steel plates in a portion of each of the stator poles are each configured to have a side face opposed to the rotor, the portion being located opposed to a rotor.

9. The motor according to claim 1, wherein the shape of a portion of the stator pole is made symmetrical in the axial direction, the portion being located opposed to the rotor.

10. The AC motor according to claim 1, wherein most of magnetic paths of the stator, including stator poles and teeth of the individual phases, the stator poles and teeth being located opposed to the rotor, as well as a back yoke are formed from a substantially single electromagnetic steel plate formed through molding, bending, and the like.

11. The AC motor according to claim 1, further comprising:
- a positive power source having a positive-side terminal T1 and a negative-side terminal T2;
- a negative power source having a positive-side terminal T3 and a negative-side terminal T4;
- an output terminal T5 connecting the terminals T2 and T3;
- serially connected two transistors TR1 and TR2, a collector of the transistor TR1 being connected to the terminal T1, an emitter of the transistor TR1 and a collector of the transistor TR2 being mutually connected to configure an output terminal T6, and an emitter of the transistor TR2 being connected to the terminal T4; and
- serially connected two transistors TR3 and TR4, a collector of the transistor TR3 being connected to the terminal T1, an emitter of the transistor TR3 and a collector of the transistor TR4 being mutually connected to configure an output terminal T7, and an emitter of the transistor TR4 being connected to the terminal T4, wherein:
- of three terminal TU, TV and TW of a three- or two-phase motor, the terminal TU is connected to the output terminal T6, the terminal TV is connected to the output terminal T5, and the terminal TW is connected to the output terminal T7.

12. An AC motor comprising:
- a stator including a U-phase stator pole, a V-phase stator pole, and a W-phase stator pole;
- a first loop winding interlinked with a first magnetic flux that passes through the U-phase stator pole;
- a second loop winding interlinked with a second magnetic flux that passes through the V-phase stator pole; and
- a third loop winding interlinked with a third magnetic flux that passes through the W-phase stator pole, wherein
- each of the U-phase, V-phase and W-phase stator poles include two or more stator poles which are collected by a combined path magnetically connected to a different phase stator pole of the U-phase, V-phase or W-phase stator poles.

* * * * *